US012792712B2

(12) United States Patent
Singh et al.

(10) Patent No.: US 12,792,712 B2
(45) Date of Patent: Nov. 10, 2026

(54) ORCHESTRATION OF SYNTHETIC DNA COMPUTING AS A SERVICE FOR DATA STORAGE LEVERAGING GENERATIVE AI AND SMART CONTRACTS

(71) Applicant: Bank of America Corporation, Charlotte, NC (US)

(72) Inventors: Shailendra Singh, Maharashtra (IN); Tarun Singh, Uttar Pradesh (IN); Hari Hara Suthan Theenathayalan, Tamil Nadu (IN); Satya Murthy Yenamandra, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 115 days.

(21) Appl. No.: 19/011,938

(22) Filed: Jan. 7, 2025

(65) Prior Publication Data

US 2026/0195434 A1 Jul. 9, 2026

(51) Int. Cl.

| | |
|---|---|
| ***G06F 21/32*** | (2013.01) |
| ***G06F 21/62*** | (2013.01) |
| ***H04L 9/32*** | (2006.01) |

(52) U.S. Cl.

CPC .......... *G06F 21/32* (2013.01); *G06F 21/6245* (2013.01); *H04L 9/3239* (2013.01)

(58) Field of Classification Search

CPC ..... G06F 21/32; G06F 21/6245; H04L 9/3239

See application file for complete search history.

(56) References Cited

U.S. PATENT DOCUMENTS

| | | | | |
|---|---|---|---|---|
| 12,121,821 | B2 | 10/2024 | Cella et al. | |
| 2019/0228081 | A1* | 7/2019 | Taig | G06F 16/9024 |
| 2022/0236886 | A1* | 7/2022 | Vishwakarma | G06F 3/0673 |
| 2023/0206261 | A1 | 6/2023 | Cella et al. | |
| 2023/0206329 | A1 | 6/2023 | Cella et al. | |

(Continued)

FOREIGN PATENT DOCUMENTS

| | | | | |
|---|---|---|---|---|
| CN | 115472232 | A * | 12/2022 | G06F 11/1004 |

*Primary Examiner* — J. Brant Murphy
*Assistant Examiner* — Nguyen-Duy Kyle Nguyen
(74) *Attorney, Agent, or Firm* — Banner & Witcoff, Ltd.

(57) ABSTRACT

Systems and methods orchestrate synthetic DNA computing as a service (DNAaaS) to enable secure and controlled data storage and retrieval by leveraging generative AI and blockchain-based smart contracts. The system analyzes digital information using generative AI to classify data based on sensitivity, generating dynamic smart contracts that define encryption protocols, storage locations, and access entitlements. Digital data is encoded into synthetic DNA sequences using an intelligent encoding engine and securely stored across distributed DNA computing infrastructures. Retrieval requests trigger corresponding smart contracts to validate user identity, aggregate DNA-encoded data from multiple locations, and decode it back into its original form. Biometric validation, device-specific authentication, and anomaly detection ensure data integrity, security, and access control. The blockchain-based ledger provides transparency, immutability, and verification of all operations. This invention facilitates scalable, efficient, and secure management of sensitive data in synthetic DNA storage environments while maintaining strict compliance with security and entitlement rules.

20 Claims, 7 Drawing Sheets

(56) References Cited

U.S. PATENT DOCUMENTS

| | | | |
|---|---|---|---|
| 2023/0214925 | A1 | 7/2023 | Cella et al. |
| 2023/0316075 | A1 | 10/2023 | Cella et al. |
| 2023/0316305 | A1 | 10/2023 | Cella et al. |
| 2023/0316357 | A1 | 10/2023 | Cella et al. |
| 2023/0325720 | A1 | 10/2023 | Cella et al. |
| 2023/0325811 | A1 | 10/2023 | Cella et al. |
| 2023/0325816 | A1 | 10/2023 | Cella et al. |
| 2023/0325829 | A1 | 10/2023 | Cella et al. |
| 2023/0342346 | A1 | 10/2023 | Cella et al. |
| 2023/0351292 | A1 | 11/2023 | Cella et al. |
| 2023/0351371 | A1 | 11/2023 | Cella et al. |
| 2023/0351393 | A1 | 11/2023 | Cella et al. |
| 2023/0410090 | A1 | 12/2023 | Cella et al. |
| 2023/0410093 | A1 | 12/2023 | Cella et al. |
| 2023/0410095 | A1 | 12/2023 | Cella et al. |
| 2023/0419277 | A1 | 12/2023 | Cella et al. |
| 2023/0419304 | A1 | 12/2023 | Cella et al. |
| 2024/0396723 | A1* | 11/2024 | Jain ......................... H04L 9/085 |

* cited by examiner

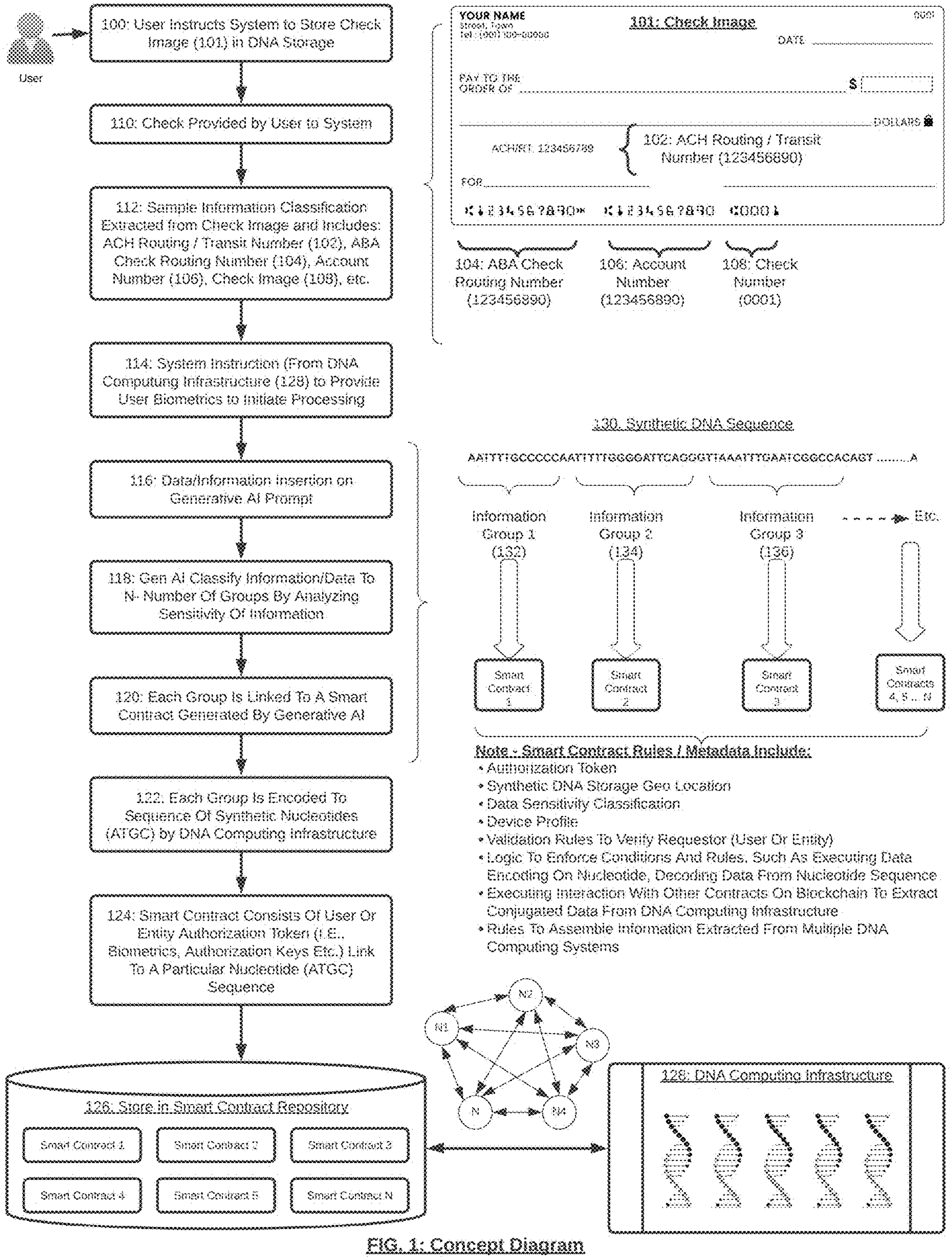
FIG. 1: Concept Diagram

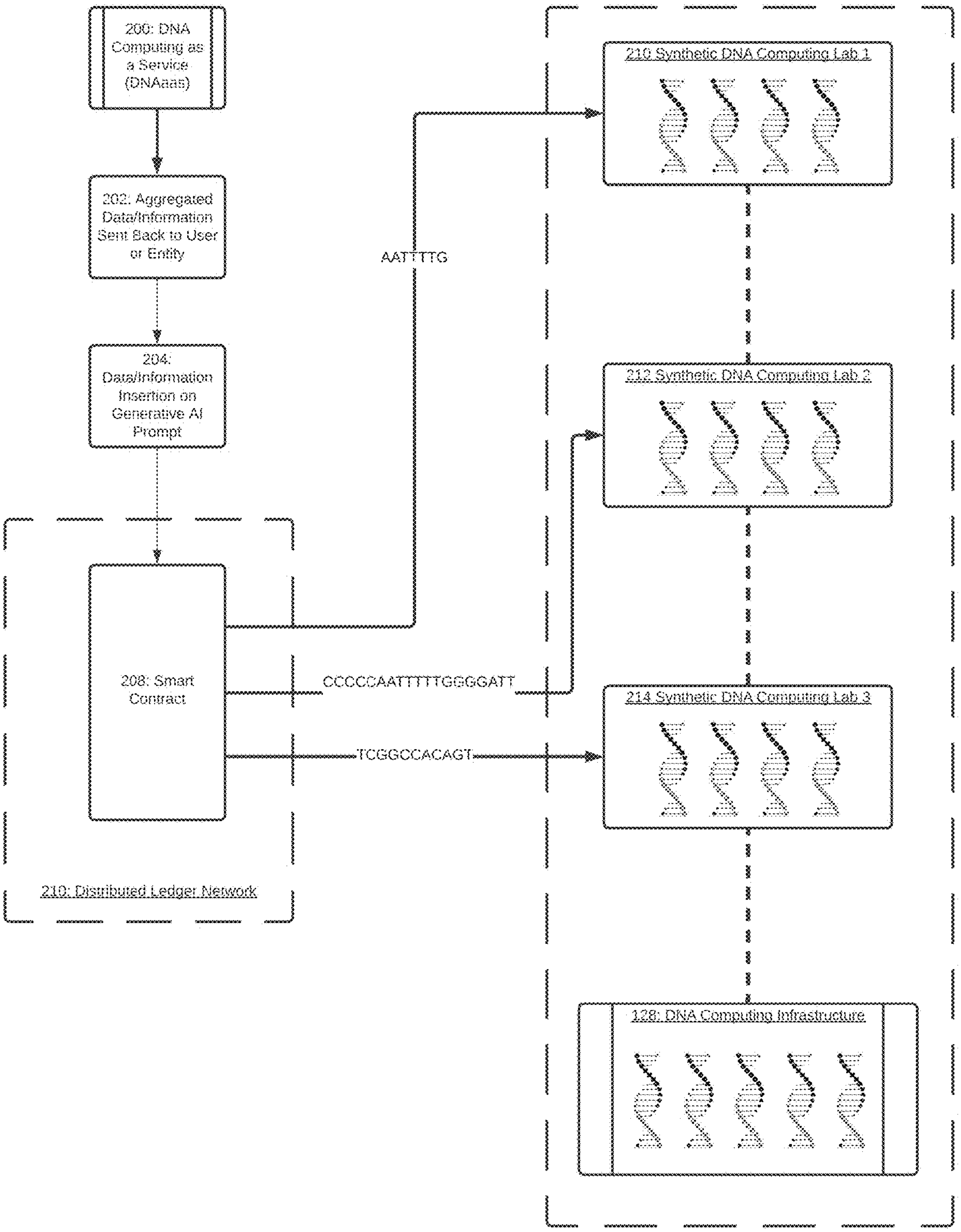
FIG. 2: Coupling Of Multiple DNA Storage Infrastructure

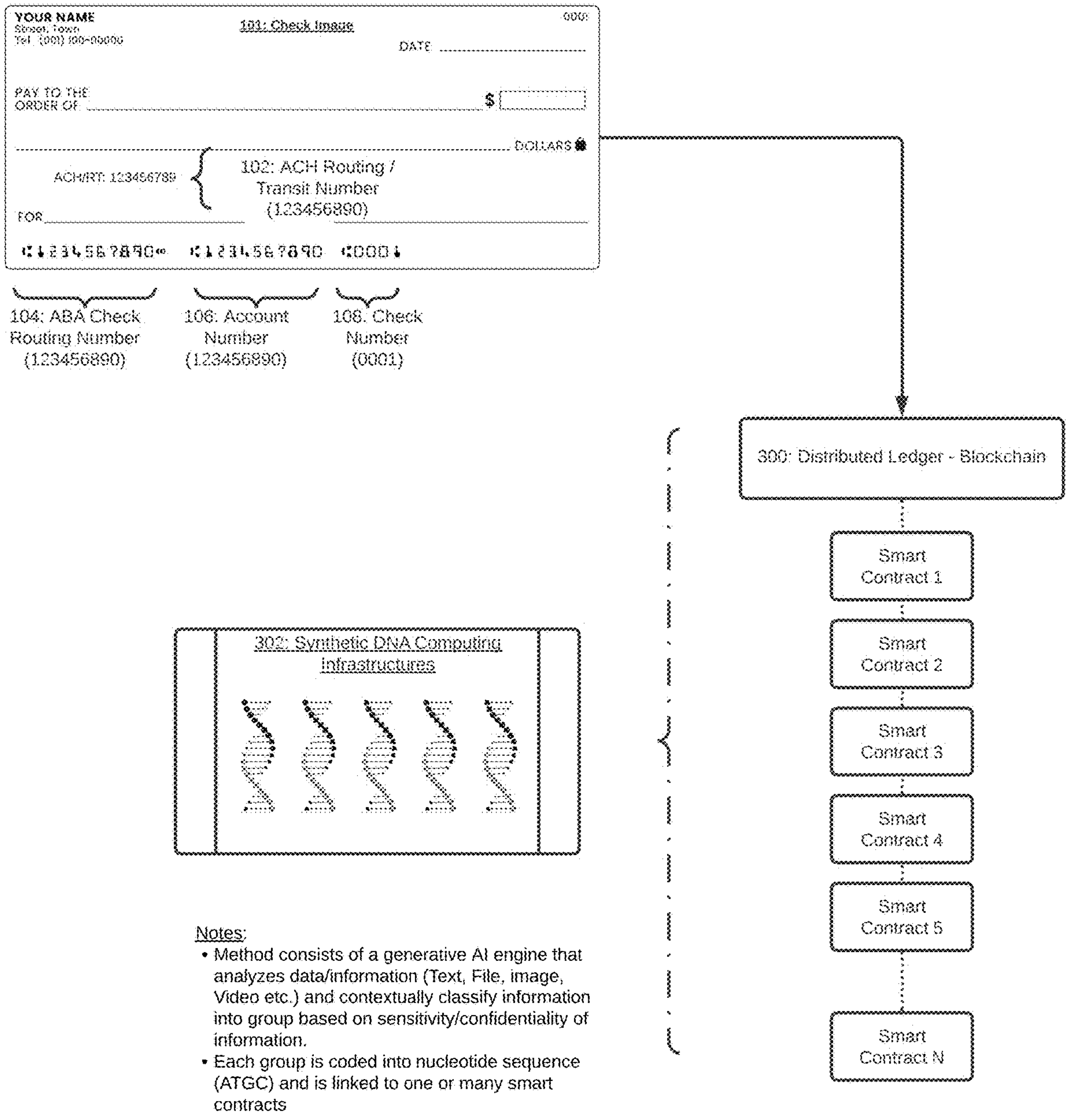
FIG. 3: Data/Information Linked to Chain of Smart Contracts

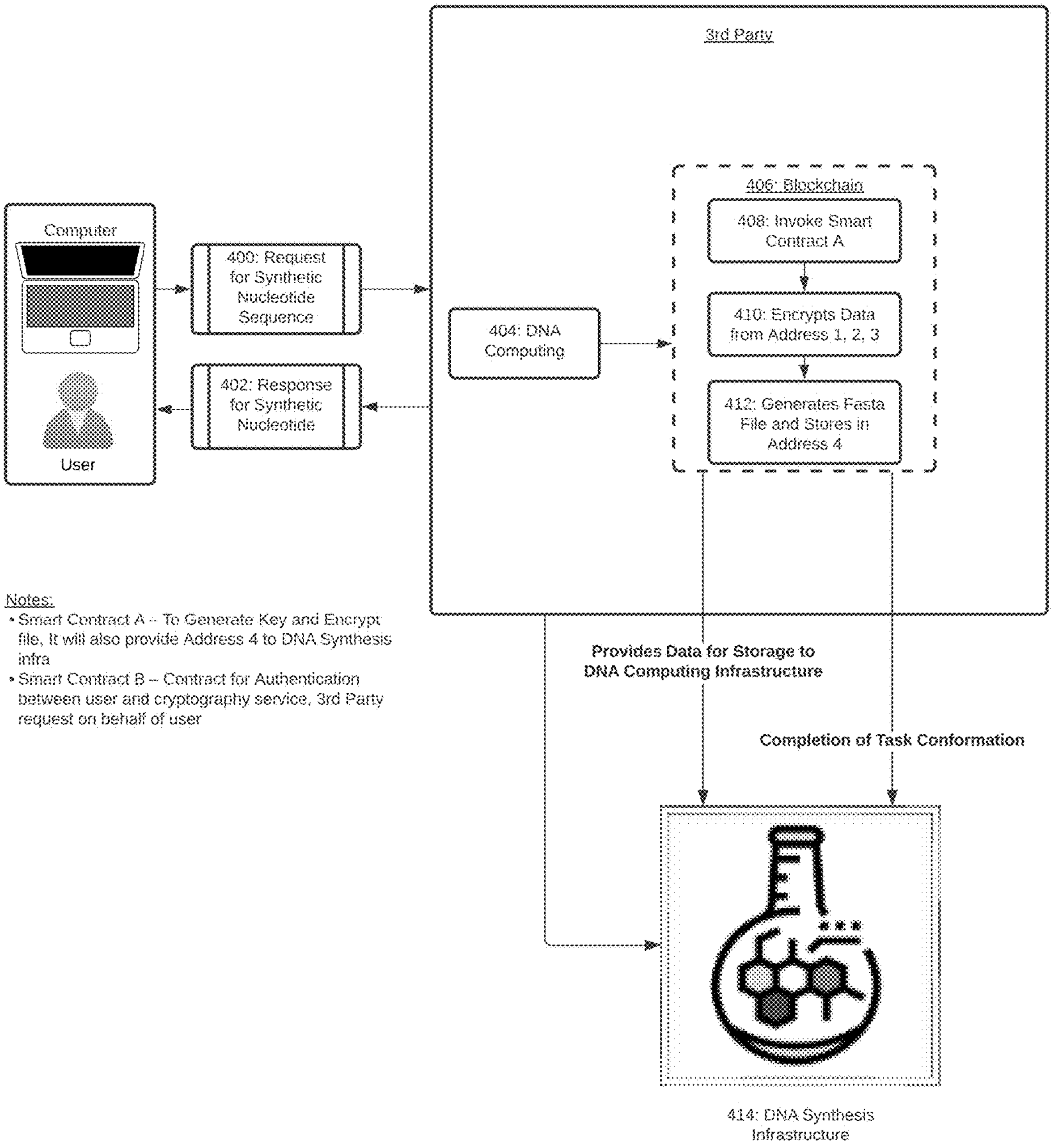
FIG. 4: Encryption/Decryption as Service

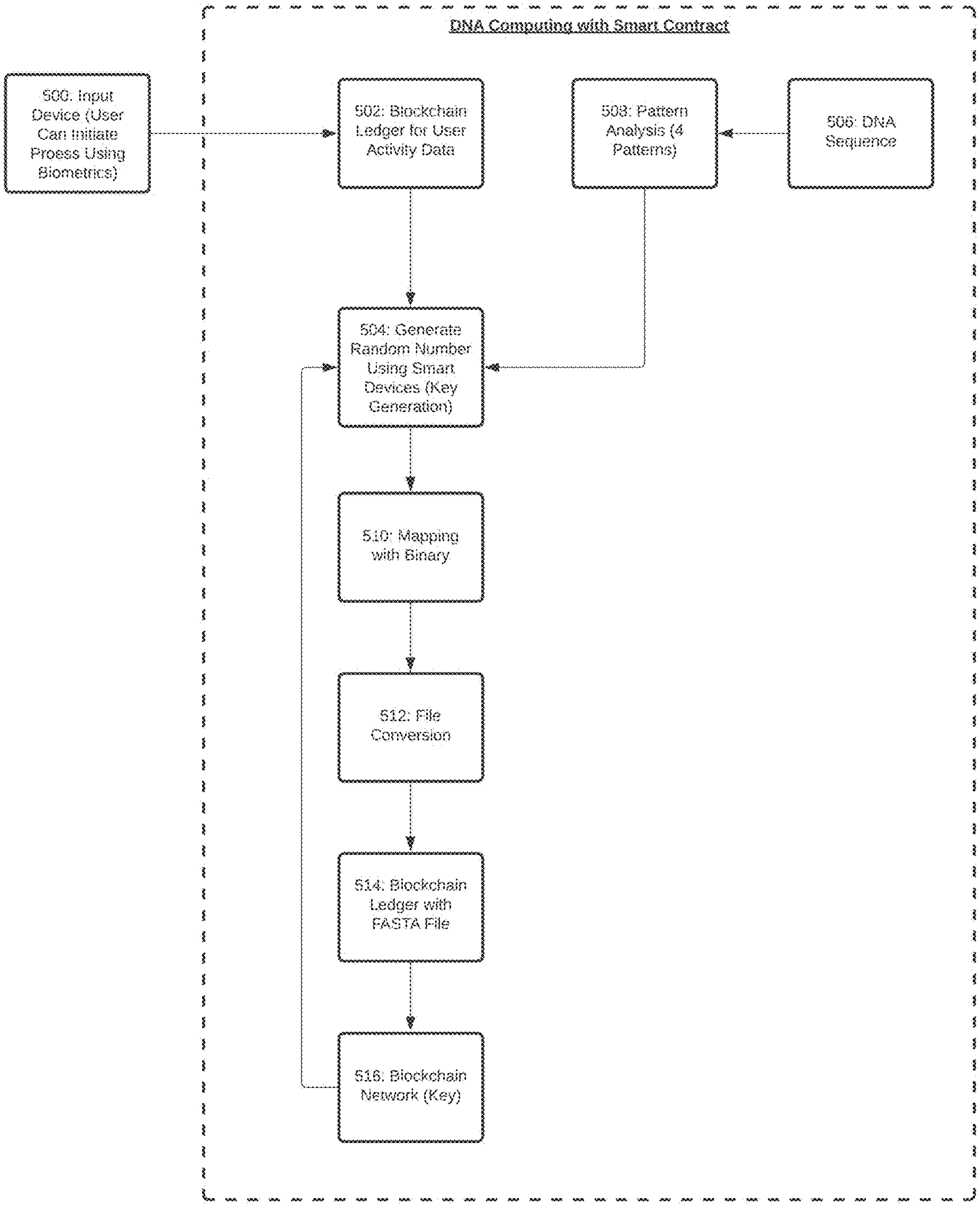
FIG. 5: Technical Flow Diagram – Encryption Using User Activity Smart Contract A

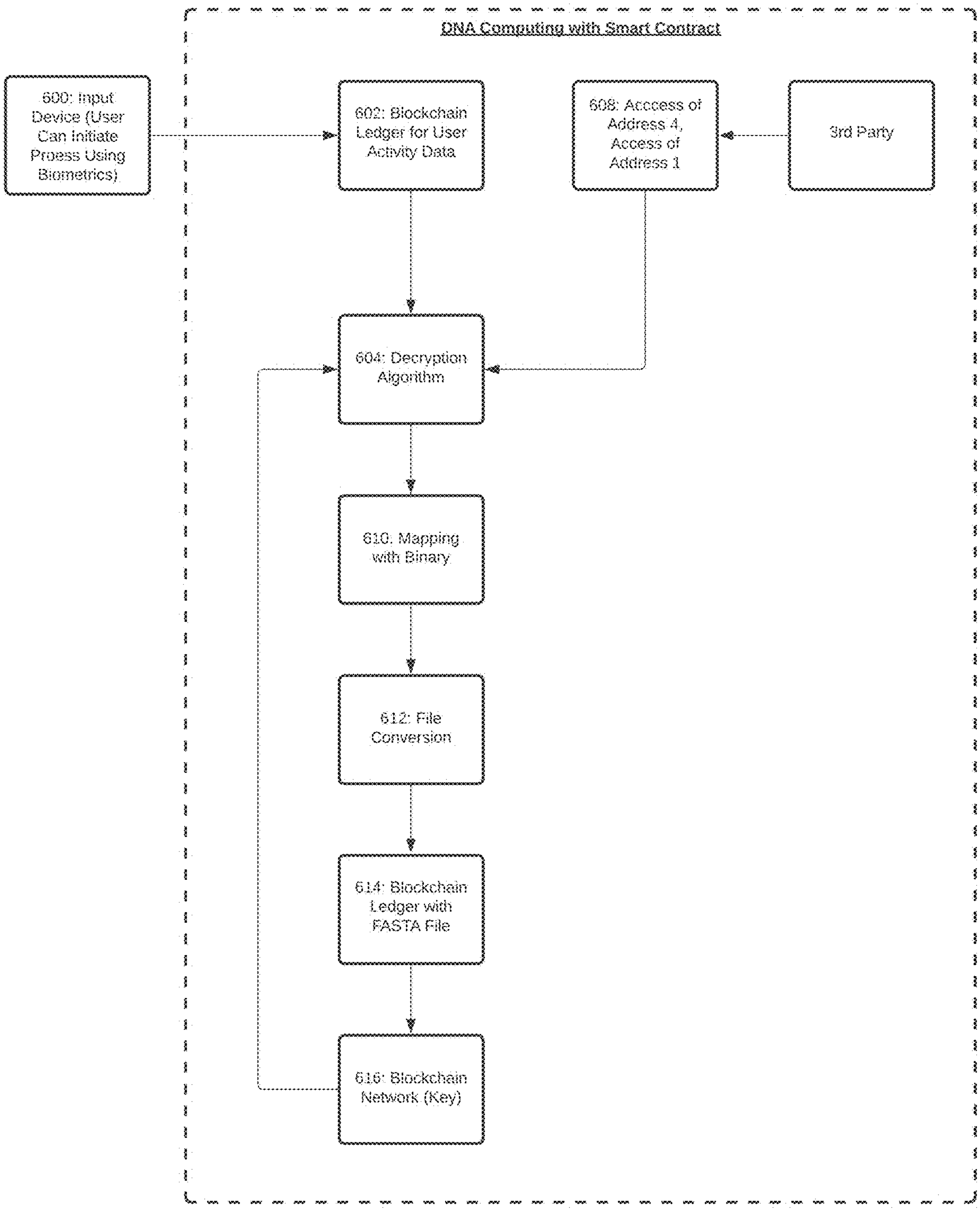
FIG. 6: Technical Flow Diagrams – Authorization Using User Activity Smart Contract B

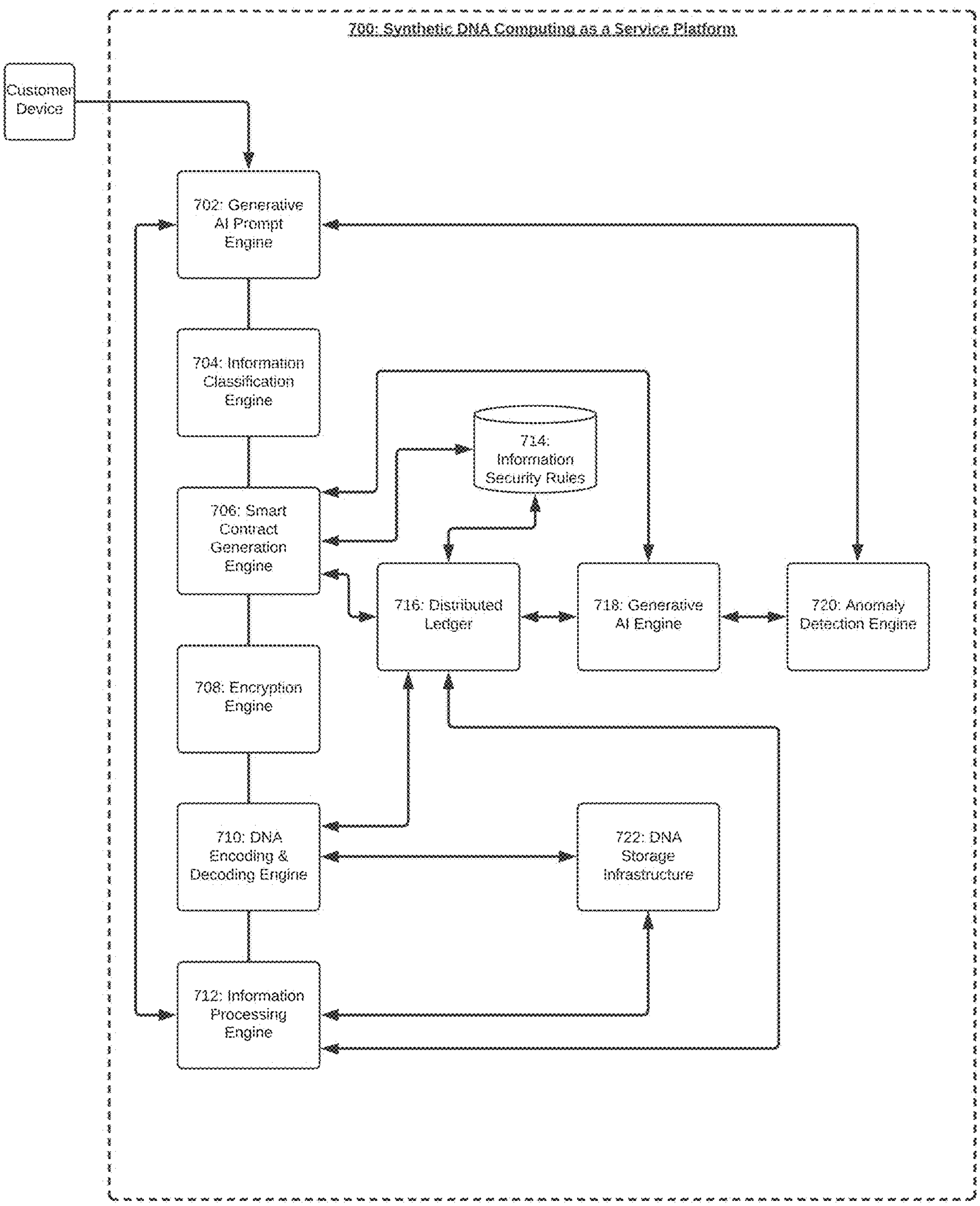
FIG. 7: Architecture Diagram

ORCHESTRATION OF SYNTHETIC DNA COMPUTING AS A SERVICE FOR DATA STORAGE LEVERAGING GENERATIVE AI AND SMART CONTRACTS

TECHNICAL FIELD

The inventions disclosed herein pertain to the field of cryptography including systems and methods for securing information through encryption, decryption, and access control techniques. This invention utilizes advanced cryptographic techniques to secure the encoding, storage, and retrieval of digital data in synthetic DNA-based storage infrastructures. Encryption algorithms dynamically adapt based on the sensitivity and classification of the data, ensuring that highly confidential information is protected against unauthorized access or tampering. The invention further leverages biometrics, device-specific tokens, and dynamic key generation to add additional layers of security during the storage and retrieval processes. By integrating cryptographic methods with smart contracts and blockchain-based distributed ledgers, the invention ensures that all operations involving DNA-encoded data, such as insertion, access validation, and extraction, are protected and secure.

DESCRIPTION OF THE RELATED ART

The increasing demand for data storage has placed immense pressure on conventional storage systems, which rely on magnetic, optical, or electronic media. These systems face significant limitations in terms of capacity, scalability, and durability. As data volumes surge exponentially, driven by advancements in technologies such as artificial intelligence, the Internet of Things, and high-resolution media, existing storage solutions are becoming unsustainable. Data centers, which house vast quantities of servers and storage infrastructure, consume enormous amounts of energy and space while incurring substantial maintenance costs. Moreover, these traditional storage methods have finite lifespans, requiring periodic replacement or migration to prevent data degradation. The reliance on large-scale physical infrastructure also presents challenges in terms of environmental sustainability, as increased energy consumption contributes to carbon emissions and other ecological concerns.

In addition to capacity constraints, the security of stored data is increasingly jeopardized by the proliferation of cyber threats. Conventional storage systems are vulnerable to breaches, unauthorized access, and data corruption. These vulnerabilities are exacerbated when sensitive or confidential information is distributed across multiple entities or cloud environments, as securing and managing access to this data becomes progressively more complex. Organizations that handle sensitive data, such as financial institutions and governmental agencies, require robust mechanisms to ensure data confidentiality, integrity, and accessibility. However, current solutions often fall short in providing adequate protection, particularly when data must be shared across multiple entities while maintaining granular control over access and usage rights.

Another critical problem lies in the inefficiencies of managing large datasets distributed across multiple storage infrastructures. Traditional storage systems lack intelligent mechanisms for data classification, which are essential for determining the sensitivity and confidentiality of individual data components. Without such classification, data is typically stored without differentiation, exposing sensitive information to unauthorized access or improper handling. In scenarios where specific subsets of information must be extracted, aggregated, or shared among multiple entities, the absence of automated data classification systems results in labor-intensive and error-prone processes. This inefficiency poses a significant challenge to organizations that require rapid, secure access to specific portions of their data without compromising its confidentiality or exposing unrelated data elements.

The process of managing multi-entity access to stored information introduces further complexities. For instance, when sensitive data, such as financial records or legal documents, must be shared across institutions, ensuring that only authorized entities can access specific portions of the data becomes exceedingly difficult. Traditional systems often rely on centralized mechanisms to manage access control, which are prone to single points of failure and inefficiencies. This reliance introduces risks such as unauthorized access, inadvertent data leakage, and failure to enforce entitlement rules. In dynamic environments where multiple entities require selective access to subsets of the same dataset, centralized systems are inadequate for maintaining data integrity and security while ensuring compliance with access policies.

The limitations of existing storage technologies are compounded by their inability to effectively scale for future needs. As organizations generate petabytes of data each day, the storage systems required to accommodate this growth must scale in a cost-effective and sustainable manner. However, traditional methods of data storage rely on physical infrastructure that cannot easily scale without significant investment in additional hardware, energy, and physical space. This approach is inherently unsustainable, as the physical footprint required for expanding storage systems is constrained by geographic and economic factors. Additionally, scaling traditional systems often involves complex data migration processes, which increase the risk of data loss, corruption, and operational downtime.

Furthermore, traditional storage systems lack mechanisms for intelligent data retrieval and management. When data is distributed across multiple storage systems or locations, retrieving specific subsets of information often requires extensive manual intervention and computational overhead. This inefficiency hinders the ability to process and analyze data in real time, which is critical for decision-making in industries such as finance, logistics, and artificial intelligence. Organizations must contend with slow and unreliable data retrieval processes that compromise their ability to deliver timely and accurate results. The inability to securely aggregate and analyze distributed data also limits the potential for cross-organizational collaboration and data-driven innovation.

In addition to inefficiencies in retrieval, existing systems provide limited mechanisms for ensuring that data is accessed in compliance with organizational policies and security protocols. Sensitive information, such as financial transactions, legal documents, or proprietary research, must be protected from unauthorized access while allowing authorized entities to retrieve specific portions of the data. Traditional systems are ill-equipped to enforce such fine-grained access control, particularly when data is stored across distributed environments. This shortcoming creates significant risks for organizations that must share data with third parties while ensuring compliance with strict security and privacy regulations.

The evolving landscape of data storage also presents challenges in ensuring long-term data durability and integrity. Traditional storage media are susceptible to physical degradation, environmental factors, and obsolescence, which can lead to data loss over time. For organizations that must store critical information for extended periods, such as legal records, scientific research, or historical archives, this presents a significant risk. Ensuring that stored data remains intact, accessible, and unaltered over decades is a persistent challenge that existing systems have failed to address effectively. The need for durable, high-capacity storage solutions that can preserve data integrity over extended timeframes remains unmet.

The lack of intelligent mechanisms for managing data sensitivity and security further exacerbates these challenges. Existing systems often apply static encryption protocols that do not account for variations in data sensitivity or evolving security requirements. This approach exposes highly sensitive data to unnecessary risks, as it does not differentiate between low-sensitivity and high-sensitivity information. Without intelligent systems capable of dynamically applying appropriate security measures based on the sensitivity and context of the data, organizations face increased vulnerability to breaches, unauthorized access, and data misuse. The inability to intelligently classify and secure data also limits the effectiveness of automated processes for managing large datasets.

The emergence of synthetic DNA as a medium for data storage has introduced new possibilities for addressing these challenges. Synthetic DNA offers unparalleled capacity for storing vast amounts of information in a highly compressed and durable form. However, existing approaches to DNA-based storage lack the necessary mechanisms for secure and controlled insertion, retrieval, and management of data. The process of encoding digital data into DNA sequences and decoding it back into usable information remains inefficient and prone to vulnerabilities. Furthermore, there is no established framework for managing access to DNA-stored data, particularly in multi-entity environments where different organizations require selective access to specific subsets of information.

Current systems for DNA-based storage also lack intelligent mechanisms for automating the classification, encryption, and retrieval of stored data. Without such mechanisms, organizations face significant challenges in ensuring that sensitive information is securely stored and accessible only to authorized entities. This is particularly critical in environments where multiple entities must interact with the same dataset, as ensuring compliance with access policies and entitlement rules becomes increasingly complex. The absence of automated systems for managing these processes hinders the adoption of DNA-based storage solutions and limits their potential to address the growing demand for secure, high-capacity storage.

The lack of a secure and efficient framework for orchestrating DNA-based storage as a service represents a significant barrier to its widespread adoption. While DNA-based storage offers immense potential, existing systems fail to provide the necessary tools for securely managing data insertion, retrieval, and access control. Organizations that handle sensitive data, such as financial institutions or research organizations, require robust mechanisms for ensuring that stored data remains secure, intact, and accessible only to authorized entities. Without such mechanisms, the risks of unauthorized access, data corruption, and operational inefficiencies remain high, limiting the viability of DNA-based storage solutions.

The complexities of aggregating and managing data stored across multiple DNA computing infrastructures further exacerbate these challenges. When data is distributed across geographically dispersed DNA labs, retrieving and aggregating specific subsets of information becomes a highly complex and resource-intensive process. Existing solutions lack the tools for securely orchestrating these processes, particularly in environments where data must be shared among multiple entities. Ensuring that retrieved data is accurate, complete, and compliant with access policies is a persistent challenge that existing systems have failed to address.

The long-felt and unmet need for this invention lies in the growing demand for a secure, scalable, and efficient framework for orchestrating data storage and retrieval in synthetic DNA computing environments. Traditional storage solutions are reaching their limits in terms of capacity, scalability, and security, while emerging technologies such as DNA-based storage remain underutilized due to the lack of robust management frameworks. Organizations require a solution that can intelligently classify, encrypt, and manage access to stored data while ensuring compliance with security and privacy policies. This need has persisted despite advancements in storage technologies, as existing solutions fail to provide the necessary tools for securely managing data insertion, retrieval, and multi-entity access. The invention addresses this critical gap by providing an intelligent framework for orchestrating synthetic DNA computing as a service, ensuring that organizations can leverage the immense potential of DNA-based storage while maintaining the highest standards of security, efficiency, and scalability.

SUMMARY OF THE INVENTION

The invention provides a highly sophisticated and intelligent method and apparatus for orchestrating synthetic DNA computing as a service, enabling secure, controlled, and efficient data insertion, storage, and retrieval. It leverages advanced technologies, including generative artificial intelligence and blockchain-based smart contracts, to manage digital information encoded into synthetic DNA sequences. Synthetic DNA, which consists of nucleotide sequences represented by combinations of A, T, G, and C, offers unprecedented advantages for storing vast amounts of data in a compact, durable, and energy-efficient form. However, the process of securely managing data stored in synthetic DNA presents significant challenges, particularly when dealing with sensitive or complex digital information that must be shared across multiple entities or systems. This invention overcomes these challenges by introducing an end-to-end framework that automates the classification, encryption, encoding, and retrieval of data while ensuring that only authorized users or entities can access the stored information.

The system relies on generative artificial intelligence to analyze and classify digital information based on its content, context, and sensitivity. When a user provides data, such as an image, text document, or video file, for storage, the system employs AI algorithms to identify and categorize different components of the data according to their level of confidentiality. For instance, in the case of a check image, the system distinguishes between highly sensitive elements, such as a signature or account number, and less sensitive elements, such as the payee name or date. This classification ensures that each subset of the data is handled according to its specific security requirements, allowing the system to apply tailored encryption protocols, encoding mechanisms, and storage procedures. By intelligently identifying and segmenting sensitive information, the invention provides a secure and efficient method for managing digital data at a granular level, ensuring that confidentiality and integrity are maintained throughout the process.

The invention introduces dynamic smart contracts that serve as an automated governance layer for managing the storage and retrieval of DNA-encoded data. These smart contracts are generated dynamically by the generative AI engine and are hosted on a distributed ledger, such as a blockchain network, to ensure transparency, immutability, and security. Each smart contract is uniquely linked to a group of classified information and defines specific rules for managing the data, including authorization tokens, encryption and decoding protocols, access entitlements, device-specific rules, and storage locations. The smart contracts play a central role in ensuring that only legitimate users or entities can interact with the system, providing a robust mechanism for enforcing data security and access control. For example, when a user initiates a data retrieval request, the smart contract validates the user's identity, device profile, and authorization rights before granting access to the stored data. By automating these processes, the invention eliminates the need for manual intervention and ensures that data is securely managed across its entire lifecycle.

The process of storing digital data in synthetic DNA involves converting binary data into nucleotide sequences, which are then synthesized and stored in DNA computing infrastructures. The invention includes an advanced DNA encoding engine that translates digital information into synthetic nucleotide sequences using intelligent algorithms. These nucleotide sequences, represented by combinations of A, T, G, and C, are synthesized and stored in DNA labs, which serve as physical storage environments for the encoded data. The invention introduces a distributed storage model, in which the DNA-encoded data is securely distributed across multiple DNA computing infrastructures based on the sensitivity and security requirements of each group of information. For instance, highly sensitive data components, such as a user's biometric information or financial records, may be stored in a preferred DNA lab with enhanced security protocols, while less sensitive components may be stored in other geographically dispersed labs. This distributed approach ensures that the data remains secure, redundant, and accessible, even in the event of failures or breaches in individual storage locations.

The retrieval process is equally intelligent and efficient, ensuring that data stored in DNA computing infrastructures can be accurately and securely reconstructed. When a user or authorized entity submits a request to retrieve specific data, the system triggers the corresponding smart contracts, which validate the request and orchestrate the retrieval process. The smart contracts ensure that only authorized subsets of the data are retrieved, based on the user's entitlements and access rights. The system then accesses the relevant DNA computing infrastructures to aggregate the DNA-encoded data from the appropriate storage locations. The DNA decoding engine applies the corresponding decryption and decoding protocols to convert the nucleotide sequences back into their original binary format, reconstructing the requested data. This process ensures that the retrieved data is accurate, complete, and securely delivered to the authorized user or entity. The system's ability to orchestrate the aggregation and decoding of DNA-encoded data from multiple storage locations further enhances its scalability and reliability.

The invention incorporates advanced encryption mechanisms to protect the data during both storage and retrieval. The encryption engine dynamically selects and applies encryption algorithms based on the sensitivity of the data, ensuring that highly sensitive information is protected using the most secure encryption protocols. The system also generates unique encryption keys using biometric inputs, device-specific parameters, and random number generation, further enhancing the security of the stored data. During retrieval, the system applies the corresponding decryption protocols to decode the data and deliver it securely to the user. This dynamic and adaptive encryption approach ensures that the stored data remains protected from unauthorized access, tampering, and breaches, providing a robust layer of security throughout the data lifecycle.

The invention integrates a distributed ledger system, such as a blockchain network, to manage and host the smart contracts. The blockchain ledger acts as a decentralized and tamper-proof record that tracks all operations, including data insertion, retrieval requests, and smart contract executions. This ensures that all transactions are transparent, verifiable, and secure, providing an immutable audit trail for data management activities. The integration of blockchain technology enhances the overall reliability and security of the system, making it suitable for environments where data integrity and compliance are critical. By leveraging blockchain-based governance, the invention ensures that DNA-based data storage and retrieval processes are executed in a secure, transparent, and auditable manner.

The modular architecture of the invention enables seamless integration of its various components, including the generative AI prompt engine, information classification engine, smart contract generation engine, encryption engine, DNA encoding and decoding engine, and anomaly detection engine. These components work together to provide a cohesive and intelligent solution for managing synthetic DNA-based data storage and retrieval. The generative AI prompt engine allows users to interact with the system through natural language prompts, simplifying the process of initiating data storage or retrieval. The information classification engine analyzes and segments the data based on its sensitivity, while the smart contract generation engine dynamically generates the rules for managing the data. The encryption engine secures the data during storage, and the DNA encoding and decoding engine handles the conversion of digital data into nucleotide sequences and vice versa. The anomaly detection engine ensures the accuracy and reliability of the system by identifying and resolving any errors or inconsistencies that may occur during data processing.

The system supports multi-entity access to stored data while maintaining strict control over data entitlements and access rights. In scenarios where multiple entities, such as financial institutions, research organizations, or government agencies, require access to the same dataset, the system ensures that each entity can only retrieve the specific portions of data they are authorized to access. For example, a bank may be granted access to a check number, while another entity may only retrieve the payee name. The smart contracts enforce these entitlement rules to ensure that sensitive information is protected and that unauthorized users cannot access restricted portions of the data. This fine-grained access control capability makes the system ideal for environments that require secure and selective data sharing.

The invention also enhances data integrity and durability, ensuring that stored information remains accurate and accessible over extended periods. Synthetic DNA offers unparalleled longevity for data storage, as nucleotide sequences can remain stable for thousands of years under appropriate conditions. The system's intelligent error detection and correction mechanisms ensure that the data remains intact and free from corruption throughout its lifecycle. By monitoring the classification, encoding, and retrieval processes for anomalies or inconsistencies, the system provides a high level of reliability and accuracy, ensuring that stored data can be retrieved in its original form without degradation or loss.

The invention represents a revolutionary approach to data storage and retrieval, combining synthetic DNA computing with advanced technologies such as generative AI and blockchain. It provides a secure, scalable, and efficient framework for managing digital information, enabling organizations to store vast amounts of data in a compact and durable form while maintaining the highest standards of security, confidentiality, and accessibility. The system's ability to classify, encode, store, and retrieve data intelligently and securely sets it apart from existing storage solutions, offering significant advantages for industries that handle sensitive or complex information. By integrating generative AI, smart contracts, and blockchain governance, the invention provides a transformative solution for the future of data management.

Various use cases highlight the versatility and robustness of the method for orchestrating secure data management, access, and classification within a synthetic DNA computing infrastructure. These examples demonstrate how the method leverages generative AI, blockchain-based governance, and multi-layered security protocols to handle data confidentiality, access control, and information aggregation across complex environments.

The method can be used to orchestrate secure data extraction between multiple entities from DNA computing infrastructure. This use case involves enabling collaboration between various authorized entities while maintaining strict control over sensitive data stored in the DNA infrastructure. For example, financial institutions, research organizations, or government agencies can securely extract specific subsets of stored data without exposing the entire dataset to unauthorized parties. By leveraging blockchain-based smart contracts, the system enforces fine-grained access control policies that allow only validated entities to retrieve data subsets that they are entitled to access. The data extraction process ensures that each entity's access is logged immutably on a blockchain ledger, providing transparency and accountability. Additionally, the segmentation and encryption of data at the DNA level guarantee that sensitive components remain protected during the transfer and extraction processes.

The method can be used as a procedure wherein DNA infrastructure can provide data only to a valid entity and user. This implementation enforces a strict multi-factor authentication process that validates the identity of both the user and the requesting entity before granting access to the stored data. For instance, if a user requests sensitive information such as financial records or biometric credentials, the system validates their identity using biometric authentication methods such as fingerprint recognition, iris scans, or facial recognition combined with device-specific validation, such as hardware tokens or unique identifiers. These validations are enforced through blockchain-governed smart contracts, ensuring that only entities fulfilling all security conditions can retrieve and decrypt the nucleotide sequences stored within the DNA infrastructure. The method ensures that unauthorized entities are denied access even if they attempt to bypass the system, maintaining strict confidentiality and access governance.

The method can be used to aggregate data hosted in multiple DNA computing infrastructures in a secure way, ensuring the sensitivity of the data. This use case highlights the system's ability to manage and consolidate sensitive data stored across geographically distributed DNA storage infrastructures. By orchestrating the aggregation process through blockchain-based smart contracts, the method ensures that all access, retrieval, and transfer operations adhere to predefined security and access control rules. For example, if a medical research organization needs to aggregate data subsets stored in DNA computing labs across different regions, the system queries the blockchain ledger to validate access entitlements and enforce data sensitivity protocols. Each subset is retrieved, validated for accuracy using error correction mechanisms, and securely aggregated without exposing sensitive components to unauthorized entities. This ensures that the aggregated data maintains its confidentiality and integrity throughout the process.

The method can be used by generative AI-driven chatbots to fetch any data request from DNA computing infrastructure. In this scenario, generative AI-driven chatbots serve as an interface between the user and the DNA computing infrastructure, enabling seamless and secure data access. A user can submit natural language queries or structured requests to the chatbot, such as "Retrieve financial records for account X" or "Fetch medical history for patient Y." The chatbot processes the request using natural language understanding and communicates with the system's smart contracts to validate the user's identity, access permissions, and query parameters. Once validated, the chatbot triggers the retrieval process, querying the DNA infrastructure to extract and decode the requested nucleotide sequences. The retrieved data is decrypted and securely delivered to the user through the chatbot interface, ensuring that access rules are strictly enforced, and all interactions are logged immutably on the blockchain ledger.

The method can be used to classify digital information like text, documents, and images using AI and control data confidentiality. This implementation leverages generative AI and machine learning algorithms to analyze and segment digital input into classified subsets based on sensitivity and content type. For example, when a document containing both sensitive financial information and general metadata is uploaded into the system, the AI engine automatically identifies components such as account numbers, routing information, and personal identifiers as highly sensitive, while general text or images are classified with lower sensitivity levels. The classified subsets are encrypted using protocols tailored to their sensitivity scores and stored securely as nucleotide sequences in the DNA computing infrastructure. The classification process ensures that highly sensitive data components are protected with the highest security measures, while non-critical components are managed efficiently, providing an optimal balance between security and accessibility. Access to each data subset is governed by smart contracts, which enforce rules for retrieval, validation, and decryption to ensure compliance with confidentiality policies.

These use cases collectively demonstrate the system's ability to orchestrate secure, intelligent, and highly controlled data operations within synthetic DNA computing infrastructures. The integration of AI-driven classification, blockchain-based governance, and multi-layered encryption ensures that data extraction, aggregation, and retrieval processes are performed securely and transparently. By applying rigorous access control mechanisms and enabling AI-driven interfaces for seamless user interactions, the system ensures that sensitive data remains protected, accessible only to authorized entities, and traceable throughout its lifecycle. This method provides a revolutionary approach to managing and securing digital information across multiple domains and environments.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, a method for securely orchestrating data storage and retrieval in synthetic DNA computing systems includes receiving, by a generative AI prompt engine, digital information and a user request to store or retrieve said digital information, wherein the user request includes biometric authentication data and device-specific information. The method further comprises analyzing, by an information classification engine, the digital information to identify and classify multiple subsets of the digital information based on sensitivity and confidentiality levels. A smart contract generation engine generates one or more dynamic smart contracts corresponding to the classified subsets of the digital information, wherein each smart contract defines encryption protocols, encoding rules, access entitlements, and storage locations for its respective subset of the digital information. The method further includes encrypting, by an encryption engine, each subset of the digital information based on the encryption protocols defined in the corresponding smart contract and encoding, by a DNA encoding engine, the encrypted subsets of the digital information into synthetic DNA sequences represented by nucleotide bases. The information processing engine then distributes the DNA-encoded subsets of the digital information to multiple synthetic DNA computing infrastructures for storage, wherein the storage locations are determined based on sensitivity and confidentiality rules defined in the corresponding smart contracts. The synthetic DNA computing infrastructures store the DNA-encoded subsets of the digital information in a secure and retrievable format. Subsequently, the generative AI prompt engine receives a user request to retrieve specific portions of the digital information, wherein the request includes biometric authentication data and device-specific information.

A smart contract generation engine validates the user request by verifying the biometric authentication data, device-specific information, and user access entitlements against the corresponding smart contracts. Upon validation, the information processing engine retrieves the DNA-encoded subsets of the digital information from one or more synthetic DNA computing infrastructures based on the validated request and corresponding smart contracts. The method includes decoding, by a DNA decoding engine, the retrieved DNA-encoded subsets of the digital information into their original encrypted form based on decoding protocols defined in the corresponding smart contracts, decrypting, by the encryption engine, the decoded subsets of the digital information to reconstruct the original digital information, and validating, by an anomaly detection engine, the integrity and accuracy of the reconstructed digital information. The validated and reconstructed digital information is transmitted, by the information processing engine, to the requesting user or entity, wherein the transmission is secured based on the access entitlements and rules defined in the corresponding smart contracts.

In some arrangements, the method further comprises that the biometric authentication data includes at least one of fingerprint data, iris scan data, facial recognition data, or voice recognition data, wherein such biometric data is used to validate the identity of the user initiating the storage or retrieval request, thereby ensuring user-specific access control.

In some arrangements, the method further comprises that the device-specific information includes at least one of a device IP address, device identifier, geolocation data, or cryptographic device token, wherein the device-specific information is analyzed to ensure that the request originates from an authorized device, thereby preventing unauthorized access to the storage or retrieval process.

In some arrangements, the method further comprises that the information classification engine dynamically updates the sensitivity classification of the digital information using machine learning models. These machine learning models are trained on historical classification patterns, user feedback, and contextual inputs, enabling the system to continuously improve and adapt sensitivity classifications for accurate and secure data handling.

In some arrangements, the method further comprises that the smart contract generation engine generates a repository of reusable smart contracts for recurring types of digital information. This repository optimizes the processing time for subsequent storage or retrieval requests by allowing the system to utilize pre-existing smart contracts for similar data types, thereby reducing computational overhead and improving operational efficiency.

In some arrangements, the method further comprises that the encryption engine dynamically selects encryption algorithms based on the sensitivity classification of the digital information. The method specifies that highly sensitive subsets are encrypted using asymmetric cryptographic protocols, which provide additional layers of security, while less sensitive subsets are encrypted using symmetric cryptographic protocols to achieve efficient and balanced processing.

In some arrangements, the method further comprises that the information processing engine distributes the DNA-encoded subsets of the digital information across synthetic DNA computing infrastructures located in geographically diverse storage facilities. This distribution ensures redundancy, data availability, and improved fault tolerance by mitigating risks associated with localized failures or breaches in any single storage infrastructure.

In some arrangements, the method further comprises that the anomaly detection engine detects inconsistencies in the reconstructed digital information during the retrieval process. Upon detection of anomalies, the anomaly detection engine triggers corrective actions, which include initiating re-aggregation of DNA-encoded subsets from the synthetic DNA computing infrastructures and reapplying decoding or error correction algorithms to restore the integrity and completeness of the digital information.

In some arrangements, the method further comprises that a blockchain-based distributed ledger records at least one of the storage request, retrieval request, validation steps, smart contract execution, and DNA storage locations. The blockchain-based distributed ledger ensures transparency, immutability, and auditability of all operations performed on the digital information, enabling verifiable and tamper-proof records of all activities related to the secure orchestration of synthetic DNA-based data storage and retrieval.

In some arrangements, a method for securely orchestrating data storage and retrieval in synthetic DNA computing systems includes receiving, by a generative AI prompt engine, digital information and a user request to store or retrieve said digital information. The user request includes biometric authentication data comprising at least one of fingerprint data, iris scan data, facial recognition data, or voice recognition data, and device-specific information comprising at least one of a device IP address, device identifier, geolocation data, cryptographic device tokens, or hardware characteristics to verify the authenticity of the device and user initiating the request. The method further includes analyzing, by an information classification engine, the digital information to identify, classify, and segment multiple subsets of the digital information based on predefined sensitivity and confidentiality levels. The sensitivity classification dynamically updates using machine learning models trained on historical classification patterns, contextual data, user behavior, and feedback to ensure accuracy and adaptability to evolving data sensitivity thresholds.

The method continues by generating, by a smart contract generation engine, one or more dynamic smart contracts corresponding to each of the classified subsets of the digital information. Each smart contract defines at least one of encryption protocols, DNA encoding rules, storage locations, user-specific access entitlements, retrieval permissions, validation requirements, device-specific rules, and geolocation restrictions. The smart contracts are stored in a repository and indexed for future reuse with recurring types of classified information, thereby optimizing processing time for subsequent storage or retrieval requests. Each subset of the digital information is then encrypted, by an encryption engine, based on encryption protocols defined in the corresponding smart contracts, wherein highly sensitive subsets are encrypted using asymmetric cryptographic protocols that provide key pair mechanisms, and less sensitive subsets are encrypted using symmetric cryptographic protocols to achieve a balance between security and computational efficiency.

The method further includes encoding, by a DNA encoding engine, the encrypted subsets of the digital information into synthetic DNA sequences. The encoding process converts the binary digital data into nucleotide sequences represented by combinations of A, T, G, and C, and encoding parameters, such as error correction algorithms, sequence redundancy levels, and storage durability requirements, are determined based on rules defined in the corresponding smart contracts. The encrypted DNA-encoded subsets are then distributed, by an information processing engine, to multiple synthetic DNA computing infrastructures located in geographically diverse and secure storage facilities. The distribution is governed by the data sensitivity classification, security protocols, and redundancy requirements defined in the smart contracts, such that highly sensitive subsets are assigned to high-security DNA labs with advanced physical and digital safeguards, and less sensitive subsets are distributed to general-purpose DNA storage infrastructures.

The synthetic DNA computing infrastructures store the DNA-encoded subsets of the digital information in a secure, durable, and retrievable format, wherein each storage location and associated security level is logged and indexed within the system for future retrieval purposes. A blockchain-based distributed ledger records all transactions associated with the storage and retrieval processes, including at least one of the storage request, retrieval request, biometric validation steps, device verification steps, smart contract execution, encryption and decryption protocols, DNA storage locations, and error correction processes. This ensures transparency, immutability, auditability, and verifiability of all operations performed on the DNA-stored data.

The method further comprises receiving, by the generative AI prompt engine, a user or entity request to retrieve specific portions of the digital information. The retrieval request includes biometric authentication data, device-specific information, contextual request parameters, and user-defined access entitlements. The smart contract generation engine validates the user retrieval request by verifying at least one of the biometric authentication data, device-specific information, and user access entitlements against the corresponding smart contracts stored on the blockchain ledger. The validation process includes checking request compliance with retrieval permissions, geolocation restrictions, and encryption protocols.

Upon validation, the information processing engine retrieves the DNA-encoded subsets of the digital information from one or more synthetic DNA computing infrastructures. The retrieval process includes orchestrating the secure aggregation of subsets of DNA-encoded data from geographically dispersed storage locations based on the storage parameters and access entitlements defined in the corresponding smart contracts. The DNA decoding engine decodes the retrieved DNA-encoded subsets of the digital information into their original encrypted form, wherein the decoding process applies error correction algorithms, data integrity checks, and sequence validation to ensure accuracy, completeness, and consistency of the decoded digital information.

The method further comprises decrypting, by the encryption engine, the decoded subsets of the digital information using the corresponding encryption protocols. Decryption keys are dynamically generated based on user biometric authentication, device-specific tokens, and contextual request parameters to ensure that only authorized users or entities can reconstruct the original digital information. The decrypted subsets are reassembled to reconstruct the original digital information.

The integrity, accuracy, and completeness of the reconstructed digital information are validated, by an anomaly detection engine, wherein the anomaly detection engine compares the reconstructed data against predefined accuracy thresholds, historical integrity benchmarks, and user feedback. Any detected inconsistencies or errors trigger corrective actions, including re-initiating data retrieval, re-aggregating DNA-encoded subsets, and reapplying decoding or error correction algorithms. The information processing engine then transmits the validated and reconstructed digital information to the requesting user or entity. The transmission process is secured based on user-specific access entitlements, encryption protocols, and validation rules defined in the corresponding smart contracts, and partial or full subsets of the digital information are delivered based on the authorization levels of the requesting user or entity. Finally, the blockchain-based distributed ledger updates a verifiable record of the retrieval transaction, including validation steps, user identity verification, storage locations accessed, decoding processes performed, error correction activities, and access entitlement enforcement, to ensure end-to-end traceability, transparency, and compliance with data management policies.

In some arrangements, a system for securely orchestrating data storage and retrieval in synthetic DNA computing systems comprises a generative AI prompt engine configured to receive digital information and a user request to store or retrieve said digital information. The request includes biometric authentication data comprising at least one of fingerprint data, iris scan data, facial recognition data, or voice recognition data, and device-specific information comprising at least one of a device IP address, device identifier, geolocation data, cryptographic tokens, or hardware characteristics. The generative AI prompt engine processes the received digital information and request for further analysis.

An information classification engine, communicatively coupled to the generative AI prompt engine, analyzes the digital information to identify, segment, and classify subsets of the digital information based on sensitivity and confidentiality levels. The information classification engine dynamically updates sensitivity classifications using machine learning models trained on historical classification patterns, contextual analysis, and user feedback.

A smart contract generation engine, communicatively coupled to the information classification engine, generates one or more dynamic smart contracts corresponding to the classified subsets of the digital information. Each smart contract defines encryption protocols, encoding rules, access entitlements, retrieval permissions, validation requirements, device-specific rules, geolocation restrictions, and storage locations. The generated smart contracts are stored in a repository and indexed for reuse with recurring digital information types.

An encryption engine, communicatively coupled to the smart contract generation engine, encrypts each classified subset of the digital information based on encryption protocols defined in the corresponding smart contracts. Highly sensitive subsets are encrypted using asymmetric cryptographic protocols, and less sensitive subsets are encrypted using symmetric cryptographic protocols. The encryption engine dynamically generates encryption keys using user biometric authentication data and device-specific parameters.

A DNA encoding engine, communicatively coupled to the encryption engine, encodes the encrypted subsets of the digital information into synthetic DNA sequences represented by nucleotide bases. The DNA encoding engine applies error correction algorithms, sequence redundancy, and encoding protocols defined in the smart contracts to ensure accuracy and durability of the DNA-encoded data.

The system further includes an information processing engine, a plurality of synthetic DNA computing infrastructures, a blockchain-based distributed ledger, a DNA decoding engine, a decryption engine, and an anomaly detection engine, all of which work collaboratively to securely orchestrate the storage, retrieval, validation, and reconstruction of the original digital information.

In some arrangements, the system includes the generative AI prompt engine further configured to analyze the user request and dynamically generate contextual parameters. These parameters include the time of request, user role, device type, frequency of access, and historical request patterns. This analysis enhances validation by determining behavioral and temporal patterns associated with the request, optimizing the processes for data classification, encryption, and retrieval during storage or access operations. The inclusion of these contextual parameters enables adaptive and secure management of digital information.

In some arrangements, the system includes the information classification engine further configured to perform multi-layer contextual analysis of the digital information. The information classification engine identifies patterns within the digital information, applies weighted sensitivity scores to individual subsets, and correlates the sensitivity of the information to predefined thresholds. Additionally, the engine analyzes metadata such as timestamps, geolocation, and content origin while refining sensitivity classifications through iterative machine learning models. These models are trained on user feedback and historical classification patterns to ensure continuous improvement in accuracy and adaptability to varying data environments.

In some arrangements, the system includes the smart contract generation engine further configured to define storage-specific security protocols for the classified subsets of the digital information. These protocols include encryption refresh cycles that periodically update encryption keys based on sensitivity levels, multi-factor validation triggers for highly sensitive data, and geofencing rules that restrict storage and retrieval operations to specific geographic regions. Additionally, the smart contract generation engine defines access expiration times for temporary or time-bound retrieval requests. This ensures dynamic and adaptive control over stored data subsets and enhances data security in storage and retrieval processes.

In some arrangements, the system includes the encryption engine further configured to generate dynamic and ephemeral encryption keys for each classified subset of the digital information. The encryption keys are derived using a combination of biometric authentication data, device-specific tokens, geolocation data, cryptographic random number generation, and time-based algorithms. This dynamic approach ensures that encryption keys are unique, unpredictable, and resistant to cryptographic attacks. The ephemeral nature of the keys further ensures that encryption keys are temporary and cannot be reused, enhancing overall data security and confidentiality.

In some arrangements, the system includes the DNA encoding engine further configured to apply redundancy and fault-tolerance protocols by creating multiple encoded DNA sequences for each highly sensitive subset of the digital information. Redundancy is achieved through duplication, fragmentation, and error correction algorithms that ensure resilience against data loss, physical degradation of DNA sequences, or anomalies in synthetic DNA computing infrastructures. The DNA encoding engine applies these protocols to guarantee data availability, durability, and accuracy across distributed storage locations.

In some arrangements, the system includes the information processing engine further configured to continuously monitor the availability, performance, and security status of the synthetic DNA computing infrastructures in real time. The monitoring process includes detecting storage anomalies, environmental risks, unauthorized access attempts, or infrastructure downtime. If potential threats or failures are identified, the information processing engine dynamically adjusts the distribution strategy by rerouting highly sensitive subsets of the digital information to alternate secure DNA computing infrastructures. This ensures data resilience, availability, and security under dynamic or adverse conditions.

In some arrangements, the system includes the blockchain-based distributed ledger further configured to store hash-based cryptographic fingerprints of the encrypted DNA-encoded data subsets. The cryptographic fingerprints are generated using secure hashing algorithms such as SHA-256 or SHA-3, and these fingerprints are used to verify the authenticity, immutability, and integrity of the stored and retrieved data. By ensuring that each subset has a unique and tamper-proof cryptographic fingerprint, the blockchain-based distributed ledger provides verifiable proof of data integrity across geographically distributed DNA computing infrastructures.

In some arrangements, the system includes the DNA decoding engine further configured to perform sequence validation and integrity verification using multi-stage error detection and correction algorithms. These algorithms include checksum calculations, parity bit validation, and advanced Reed-Solomon error correction methods. The DNA decoding engine ensures accurate decoding and reconstruction of the digital information, even in cases where the DNA-encoded data is fragmented, partially degraded, or distributed across multiple geographically diverse storage infrastructures.

In some arrangements, the system includes the anomaly detection engine further configured to continuously log detected anomalies in a centralized audit repository. The anomaly detection engine generates real-time alerts for system administrators or automated monitoring systems when inconsistencies or errors are identified. Additionally, the engine triggers machine learning-based corrective measures that include reclassifying misidentified data, re-initiating retrieval processes, recalibrating sensitivity classifications, and refining encoding, encryption, and decoding parameters. These corrective actions enhance future system performance, reduce the likelihood of recurring anomalies, and ensure the integrity, accuracy, and security of stored and retrieved digital information.

The following description and claims, in conjunction with the drawings-all integral parts of this specification-will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 depicts a conceptual diagram showing the process of storing a check image in synthetic DNA storage, where generative AI classifies the information into sensitivity-based groups, links each group to smart contracts, and encodes the data into nucleotide sequences for secure storage in a DNA computing infrastructure.

FIG. 2 depicts the coupling of multiple DNA storage infrastructures, illustrating how data is aggregated from geographically dispersed synthetic DNA labs and orchestrated through smart contracts for storage and retrieval as part of DNA Computing as a Service (DNAaaS).

FIG. 3 depicts the linkage of data or information to a chain of smart contracts, showing how generative AI classifies sensitive components of digital data, encodes them into nucleotide sequences, and associates them with smart contracts stored on a distributed blockchain ledger.

FIG. 4 depicts encryption and decryption as a service, where user requests for DNA-stored nucleotide sequences are processed via smart contracts to encrypt and securely store data in FASTA file format within a DNA computing infrastructure.

FIG. 5 depicts the technical flow for encryption using user activity and Smart Contract A, including generating encryption keys, encoding binary data into DNA sequences, and recording FASTA files in a blockchain ledger for secure data management.

FIG. 6 depicts the technical flow for authorization using user activity and Smart Contract B, where access requests trigger validation processes, including biometric verification and decryption algorithms, to retrieve data stored in DNA computing infrastructures.

FIG. 7 depicts the architecture diagram of the system, showing key components such as the generative AI engine, information classification engine, smart contract generation engine, encryption and DNA encoding engines, information processing modules, and DNA storage infrastructure orchestrated for secure data insertion and retrieval.

DETAILED DESCRIPTION

The inventions disclosed herein provide systems and methods for orchestrating secure, scalable, and intelligent data management within synthetic DNA computing infrastructures. The invention integrates generative AI engines, blockchain-based governance using smart contracts, dynamic encryption protocols, and advanced DNA encoding and decoding processes to securely classify, encrypt, store, and retrieve digital information. This multi-layered approach enables unprecedented levels of security, data confidentiality, fault tolerance, and scalability for the management of highly sensitive and non-sensitive data. The invention is designed to transform digital input into DNA-encoded representations, leveraging the exceptional data density, durability, and storage efficiency of synthetic DNA while enforcing stringent access control rules, validation processes, and traceable auditability. By combining synthetic DNA storage with blockchain and AI-driven orchestration, the invention addresses the growing need for secure and future-proof solutions for digital data storage and retrieval.

At the core of the invention is the generative AI engine, which acts as the first point of interaction for digital data entering the system. The AI engine analyzes, segments, and classifies input data into logical groups based on its sensitivity, content, and contextual importance. For example, when a check image, financial document, or biometric record is submitted, the AI engine identifies and separates highly sensitive components, such as account numbers, routing details, and personal identifiers, from less critical components like metadata or background content. This classification enables the system to apply tailored security and encryption protocols to each group, ensuring that data subsets with higher sensitivity are treated with stricter controls. The AI dynamically learns from contextual patterns, historical datasets, and predefined rules to improve the accuracy of the classification process over time.

Once the generative AI engine classifies the data, the system dynamically generates smart contracts for each segmented group of information. The smart contracts, stored immutably on a blockchain-based distributed ledger, serve as automated governance mechanisms that enforce rules for encryption, storage, validation, and retrieval. Each smart contract contains metadata specifying encryption algorithms, storage locations, access control policies, and decryption conditions for its corresponding data group. For instance, a smart contract associated with highly sensitive financial data may require asymmetric encryption, biometric validation, and multi-factor authentication for access, while contracts governing non-sensitive metadata may allow simpler validation mechanisms. The blockchain ledger ensures that all smart contracts remain tamper-proof, transparent, and auditable, providing a verifiable record of every operation performed on the data.

Following classification, the segmented data subsets are passed to the encryption engine, which applies dynamic encryption protocols based on the sensitivity classification defined in the smart contracts. The encryption engine generates unique encryption keys for each data subset using a combination of biometric inputs, device-specific parameters, and cryptographic random number generation. For example, a user may provide a fingerprint scan, iris recognition, or facial authentication as part of the key generation process, ensuring that the encryption keys are uniquely tied to the user's identity. Device-specific attributes such as hardware tokens, IP addresses, and geolocation data further strengthen the security and uniqueness of the encryption keys. Highly sensitive data is encrypted using asymmetric encryption methods such as RSA or elliptic curve cryptography, which require corresponding private keys for decryption, while moderately sensitive data subsets may use symmetric encryption algorithms like AES to balance security and computational efficiency.

The encrypted data subsets are then converted into DNA-encoded representations using the DNA encoding engine. This engine translates the encrypted binary representation of each data subset into nucleotide sequences composed of adenine (A), thymine (T), guanine (G), and cytosine (C). These nucleotide sequences are highly compact, durable, and efficient for long-term storage, enabling the system to encode vast amounts of digital information in minimal physical space. Each nucleotide sequence is stored as part of a standardized FASTA file, ensuring compatibility with DNA synthesis infrastructures. The DNA encoding engine applies error-resistant encoding algorithms to optimize the reliability of the sequences and prevent data degradation. Once encoded, the nucleotide sequences are transferred to secure DNA synthesis infrastructures, where they are synthesized into physical DNA strands and stored across geographically distributed facilities to ensure redundancy, resilience, and fault tolerance.

The system governs the storage and access of the DNA-encoded data through the blockchain-based smart contracts, which link each nucleotide sequence to its corresponding encryption metadata, storage rules, and validation protocols. The blockchain ledger provides an immutable and transparent audit trail of all operations, including data segmentation, encryption, encoding, and storage. By leveraging the distributed nature of the blockchain, the system ensures that all operations are verifiable, tamper-proof, and resistant to unauthorized manipulation. For example, when a user or entity requests access to specific nucleotide sequences, the system queries the blockchain ledger to validate the requester's identity and entitlement based on the rules embedded in the corresponding smart contract.

The retrieval process begins when an authorized user or entity submits a request to access specific data stored in the DNA infrastructure. The request must pass multiple layers of validation, including biometric authentication, device-specific validation, and cryptographic token verification. The system enforces these validations to ensure that only authorized users operating trusted devices can access the DNA-stored data. Once validated, the system retrieves the relevant nucleotide sequences from their designated DNA storage locations, which may include geographically dispersed facilities for redundancy. These sequences are passed to the DNA decoding engine, which reverses the encoding process to convert the nucleotide sequences back into their encrypted binary form.

The DNA decoding engine applies robust error correction mechanisms, such as Reed-Solomon error correction, anomaly detection algorithms, and redundancy checks, to validate the integrity and accuracy of the decoded sequences. If any errors or inconsistencies are detected, the system retrieves redundant copies of the nucleotide sequences from alternative DNA storage locations to reconstruct the original data with high fidelity. This fault-tolerance mechanism ensures that the system remains resilient to potential storage degradation or environmental factors affecting the DNA strands. Once the sequences are successfully decoded, the encrypted binary data is decrypted using the cryptographic keys defined in the corresponding smart contract.

The decryption process ensures that only authorized users with access to the appropriate cryptographic keys can reconstruct the original digital data. For highly sensitive data subsets encrypted using asymmetric algorithms, the system requires the corresponding private keys to perform decryption, further enhancing security. The decrypted data is reassembled to its original form and securely delivered to the authorized user or entity. Throughout the retrieval process, the blockchain ledger logs all operations, including validation checks, smart contract invocations, storage access, decoding, and decryption events. This immutable audit trail provides transparency, traceability, and accountability for every interaction with the DNA-stored data.

In addition to enabling secure storage and retrieval, the invention supports collaborative data aggregation across multiple DNA computing infrastructures. By querying smart contracts and validating access entitlements, the system can securely aggregate data subsets stored in geographically distributed DNA facilities. This enables entities such as research organizations or financial institutions to aggregate sensitive data without compromising confidentiality or exposing unauthorized components. The system ensures that each subset is validated, retrieved, and reassembled securely while adhering to the sensitivity rules defined in the smart contracts.

The invention also facilitates integration with AI-driven chatbots and intelligent interfaces, enabling seamless user interactions for data access and retrieval. Users can submit natural language queries or structured requests, which are processed by generative AI engines that interact with blockchain-governed smart contracts. The chatbot validates the request, retrieves the relevant nucleotide sequences, and triggers the decoding and decryption processes to securely deliver the requested data to the user. This approach provides an intuitive and efficient way to access DNA-stored data while maintaining strict security and validation controls.

The system's classification capabilities further enable it to analyze and segment digital input such as text, documents, images, or multimedia files. The generative AI engine identifies sensitive components, assigns sensitivity scores, and applies encryption and storage protocols tailored to the classification. This dynamic classification process ensures that highly sensitive components are isolated, encrypted, and stored securely, preventing unauthorized access while enabling efficient management of non-critical information. By integrating AI-driven classification with DNA storage, the invention provides a scalable and intelligent solution for managing complex datasets.

The invention offers unparalleled fault tolerance and reliability through its use of redundant storage and error correction mechanisms. The system ensures that multiple copies of each nucleotide sequence are stored across geographically distributed facilities, enabling recovery in the event of storage degradation or physical damage. The use of blockchain ensures that all operations remain verifiable, auditable, and tamper-proof, providing organizations with full transparency and accountability. The combination of generative AI, blockchain governance, dynamic encryption, and DNA encoding provides an end-to-end solution for managing, securing, and retrieving digital information in a highly efficient and scalable manner.

In summary, the invention revolutionizes digital data storage and retrieval by leveraging synthetic DNA computing, blockchain-based smart contracts, and AI-driven orchestration. The system ensures that sensitive data remains secure, accessible only to authorized users, and resilient to environmental or operational risks. By providing a robust architecture for classifying, encrypting, encoding, storing, and retrieving digital data, the invention addresses the need for a scalable, fault-tolerant, and future-proof solution for managing sensitive information in synthetic DNA storage environments. It represents a groundbreaking approach to secure data management that combines emerging technologies to deliver unparalleled durability, security, and efficiency.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

In various configurations, terms such as "computers" and "machines" refer to devices that may be general-purpose or specialized for specific tasks, whether physical or virtual, and capable of network connectivity. These devices encompass all necessary hardware, software, and components known to skilled practitioners, including application-specific integrated circuits (ASICs), microprocessors, cores, or other processing units. These components execute, control, or implement various types of software, instructions, data, modules, processes, or routines. The terms used do not restrict the device type and should be broadly interpreted. Software, data, and executable code can reside on various physical, computer-readable storage devices, such as local memory, cloud-based storage, or network-attached storage. These can be stored in both volatile and non-volatile memory and may function autonomously or respond to specific triggers. These elements can be consolidated or distributed across multiple devices and stored in accessible memory systems such as distributed databases, big data infrastructures, blockchains, or distributed ledgers.

Networks and similar references refer to a broad range of communication systems, from local area networks (LANs) and wide area networks (WANs) to the Internet and cloud-based networks, supporting wired and wireless configurations. Specialized networks like digital subscriber line (DSL), frame relay, asynchronous transfer mode (ATM), and virtual private networks (VPN) are included. These networks utilize various hardware and software components, including modems, routers, firewalls, switches, and adapters, to facilitate communication. Networks are also equipped with virtual IP addresses and support multiple protocols like HTTPS, enabling effective packet-based data transmission and communication.

Generative Artificial Intelligence (AI) refers to AI techniques that learn from training data and generate new content, such as text, code, images, and audio. Generative AI systems, often powered by large language models (LLMs) like GPT-3, GPT-4, Meta LLaMA, and others, can be deployed through APIs, search engines, or chatbots. These models, which may be proprietary or open source, leverage deep learning methods and are generally governed by enterprise policies regarding AI and risk. Models such as BERT, T5, AlphaFold, Watson, Megatron, and others play a role in generating or interpreting language and content for various applications.

Generative AI and LLMs are utilized throughout this disclosure for tasks including natural language processing, data analysis, real-time processing, software development, and creative content generation. Specific functions include trend analysis, data classification, sentiment analysis, writing assistance, language translation, and decision-making support. These models enable capabilities like feedback learning, context determination, and comprehensive search operations, improving performance through iterative learning and feedback from human or system interactions. The wide range of applications supported by generative AI makes these systems a powerful tool in generating, analyzing, and managing information across diverse fields. All configurations and uses of these models are within the scope of this disclosure.

FIG. 1 depicts a highly detailed conceptual diagram showcasing the end-to-end process of securely storing and managing a check image as digital data in a synthetic DNA-based storage infrastructure. This process involves a combination of generative AI for data classification, blockchain-based smart contracts for governance, encryption for securing sensitive information, and DNA encoding for durable storage. The figure begins with a user 100 providing a digital check image 101 to the system, which serves as an example of complex data containing both sensitive and non-sensitive components. The check image itself includes critical data such as an ACH routing/transit number 102, an ABA routing number 104, an account number 106, and a check number 108. This information must be segmented, secured, and stored in a controlled manner, as it contains both public and highly confidential elements. The user initiates this process through a generative AI prompt interface, which may accept inputs in natural language or structured digital instructions. For example, a user might input a request such as "store check image in DNA storage" into the system, providing both the check image 110 and necessary authentication credentials to begin processing.

Once the check image is provided, the system immediately triggers a series of operations beginning with information extraction and classification. The generative AI engine analyzes the submitted check image 112 to extract its constituent components, including highly sensitive data such as the routing number, account number, and signature. This classification process is powered by AI algorithms trained on historical patterns, contextual inputs, and predefined rules for data sensitivity. For example, the ACH routing/transit number 102 and ABA routing number 104 are identified as sensitive financial data that require elevated security measures, while the check number 108 may be classified with a lower sensitivity level. The AI dynamically segments the information into logical groups based on their classification and assigns a corresponding sensitivity score to each group. By segmenting the digital data in this manner, the system ensures that each group can be independently secured, encrypted, and stored according to its sensitivity level.

Following classification, the system generates individual smart contracts for each group of classified information. These smart contracts 120 are dynamically created by the generative AI engine and serve as automated governance mechanisms for managing data storage and retrieval. Each smart contract defines a set of rules, parameters, and conditions specific to the group it governs, including encryption protocols, storage locations, access permissions, and validation requirements. For instance, a smart contract linked to the account number might include asymmetric encryption rules, biometric authentication requirements, and storage mandates that direct the data to highly secure DNA storage locations. The metadata within the smart contracts includes user-specific tokens, device-specific identifiers, and cryptographic keys that further enhance the security and control mechanisms. Once generated, the smart contracts are stored in a blockchain-based distributed ledger, ensuring immutability, transparency, and verifiability. The smart contract repository 126 acts as a centralized registry, cataloging all active contracts for future retrieval and enforcement.

The classified and segmented groups of information are then subjected to encryption based on the rules defined in their respective smart contracts. The system employs a dynamic encryption engine to apply encryption protocols that align with the sensitivity classification of each group. Highly sensitive groups, such as the ACH routing/transit number 102 or the user's signature, may be encrypted using asymmetric cryptographic methods, which involve public-private key pairs to ensure maximum security. Less sensitive groups, such as non-critical portions of the check image, may utilize symmetric encryption to optimize processing efficiency. The encryption keys used for this process are generated dynamically using a combination of biometric inputs, device-specific information, and random cryptographic algorithms. For example, when the user provides fingerprint or facial recognition data during the initiation of the process, this biometric input is used to generate an encryption key specific to the data group being processed. These encryption keys are ephemeral in nature, ensuring that they are refreshed periodically to prevent vulnerabilities associated with key reuse.

Once encrypted, each group of classified data is encoded into synthetic DNA sequences by the DNA encoding engine. This process involves converting the encrypted binary data into nucleotide sequences represented by the four DNA bases: adenine (A), thymine (T), guanine (G), and cytosine (C). For example, the encrypted content corresponding to the routing number or account number is converted into a unique sequence such as "AATTTTGCCCCCAAT-TTTTGGGGATTCAGGGTTAAATTTGAATCGGC-CACAGT." The nucleotide sequences 122 are generated in a manner that optimizes durability, compactness, and resilience, ensuring that they remain intact over extended periods and under various environmental conditions. These sequences are then synthesized into physical strands of synthetic DNA, which serve as the storage medium for the encoded digital data.

The synthesized nucleotide sequences corresponding to each group of classified data are distributed across multiple synthetic DNA computing infrastructures 128 for secure storage. The system assigns storage locations for each sequence based on the rules specified in the smart contracts. For example, highly sensitive data may be stored in secure, geographically dispersed DNA labs with enhanced physical and digital safeguards, while less sensitive data may be stored in general-purpose DNA computing facilities. The use of a distributed storage model ensures redundancy, durability, and fault tolerance, as multiple copies of the nucleotide sequences are maintained across different labs. Each storage location and its associated metadata, such as geographic coordinates and lab identifiers, are recorded in the blockchain-based distributed ledger, providing a transparent and verifiable record of where the data resides.

The smart contracts 124 play a critical role in orchestrating access control and retrieval processes for the stored nucleotide sequences. For instance, if a user or entity later requests to retrieve specific information, the system triggers the relevant smart contracts to validate the request. Validation includes verifying user identity through biometric authentication, device-specific credentials, and access entitlements. Only upon successful validation does the system retrieve the nucleotide sequences from the DNA computing infrastructure 128. The blockchain ledger 210 ensures that all access and retrieval events are logged immutably, providing a tamper-proof audit trail for compliance and security purposes.

The diagram further illustrates how the classified groups of information, such as group 1 (132), group 2 (134), and group 3 (136), are individually managed and encoded. Each group corresponds to a unique smart contract that dictates how the group is stored, secured, and accessed. For instance, group 1, representing a highly sensitive data subset like a user's signature, may be stored in a high-security DNA lab, while group 3, representing less critical information, may reside in a lower-security facility. This modular approach to managing classified groups ensures that sensitive information is never stored or retrieved alongside less sensitive components, thereby mitigating risks of unauthorized access.

The conceptual diagram concludes by emphasizing the system's integration of generative AI, blockchain governance, and DNA storage infrastructure to securely manage the insertion and retrieval of digital information. The generative AI engine dynamically analyzes and classifies the data, the smart contracts enforce security and access rules, and the DNA encoding engine converts encrypted data into durable nucleotide sequences. The blockchain ledger records all events, ensuring transparency, verifiability, and accountability throughout the process. This seamless orchestration of technologies provides a revolutionary solution for securely storing, managing, and retrieving sensitive digital information in synthetic DNA storage infrastructures while maintaining the highest levels of security, scalability, and long-term durability.

FIG. 2 provides a detailed illustration of the coupling of multiple synthetic DNA computing infrastructures, highlighting the sophisticated orchestration of data insertion, storage, and retrieval across geographically distributed DNA labs under the management of a centralized DNA computing infrastructure. The figure presents an interconnected framework where data flows between users, generative AI-based classification systems, blockchain-governed smart contracts, and physically dispersed DNA storage labs. This configuration ensures seamless, secure, and fault-tolerant data management within a synthetic DNA computing ecosystem, making it ideal for long-term, high-capacity data storage and controlled retrieval. The process begins with the DNA computing infrastructure 128, which serves as the operational and computational backbone of the system. The DNA computing infrastructure not only manages the encoding and decoding of data into nucleotide sequences but also handles orchestration tasks such as assigning storage locations, validating retrieval requests, and ensuring compliance with rules defined in smart contracts. This infrastructure bridges the gap between digital information and physical DNA storage labs while enabling advanced security, redundancy, and scalability features.

When a user or entity submits digital data for storage, such as a financial document or multimedia file, the process begins with the generative AI engine analyzing and classifying the data. This is represented by the data/information insertion process 204 in the figure. The generative AI engine deconstructs the input into multiple subsets based on sensitivity, confidentiality, and context. For example, a check image might be segmented into distinct components such as the account number, routing number, payee name, and user signature, with each segment assigned a sensitivity classification. Highly sensitive subsets, such as the signature or account number, are flagged for enhanced encryption and secure storage protocols, while less sensitive subsets may follow standard protocols for efficiency. Once classified, the encrypted subsets of data are converted into synthetic DNA sequences through an encoding process that maps binary data into combinations of nucleotides, including adenine (A), thymine (T), guanine (G), and cytosine (C). Each subset is encoded as a unique nucleotide sequence and prepared for secure insertion into the DNA computing infrastructure.

The DNA computing infrastructure 128 acts as the orchestrator for determining where each nucleotide sequence will be stored within the distributed DNA storage system. FIG. 2 shows multiple synthetic DNA computing labs, including synthetic DNA computing lab 1 (210), synthetic DNA computing lab 2 (212), and synthetic DNA computing lab 3 (214). These labs represent physical facilities capable of synthesizing, hosting, and maintaining DNA strands that encode the digital data. The infrastructure dynamically assigns storage locations for each nucleotide sequence based on sensitivity classifications, security policies, and redundancy requirements. For example, highly sensitive data subsets may be directed to synthetic DNA computing lab 1 (210), which could be a high-security facility with advanced physical safeguards, such as restricted access protocols, environmental monitoring, and multi-layered encryption mechanisms. Moderately sensitive or low-sensitivity subsets may be directed to lab 2 (212) or lab 3 (214), where they are stored under standard security protocols. This intelligent distribution of nucleotide sequences across multiple storage labs enhances security, ensures compliance with sensitivity-based storage rules, and provides robust fault tolerance.

The coupling of multiple DNA storage labs enables the system to implement redundancy and fault-tolerance mechanisms to protect against data loss, corruption, or failure at any single storage location. Redundant copies of nucleotide sequences are generated and stored across geographically dispersed labs to provide failover support and improve data durability. For example, if a nucleotide sequence stored in lab 1 (210) becomes inaccessible due to environmental degradation, physical damage, or operational issues, the system automatically retrieves a redundant copy from lab 2 (212) or lab 3 (214). This distributed redundancy ensures uninterrupted access to the data and enhances the reliability of the overall storage system. Additionally, the system leverages blockchain-based smart contracts to log and manage all storage-related operations, providing an immutable record of where each data subset is stored and enabling seamless tracking of its lifecycle.

The process of aggregating data back to the user or entity is represented by aggregated data/information sent back to the user or entity 202 in the figure. When a user or authorized entity submits a request to retrieve specific data stored within the DNA computing infrastructure, the system triggers the relevant smart contracts associated with the requested nucleotide sequences. These smart contracts, which were generated during the classification and storage phases, contain the rules for validating the retrieval request and determining access entitlements. The validation process involves multi-factor authentication mechanisms, such as biometric verification, cryptographic token validation, and device-specific checks. For example, the user may be required to provide fingerprint or facial recognition data, combined with device-specific credentials such as IP addresses or unique identifiers, to prove their identity and authority to access the data. Once validated, the system queries the blockchain-based distributed ledger to determine the exact storage locations of the nucleotide sequences. The ledger provides immutable records of where each sequence resides, ensuring accuracy, transparency, and verifiability during the retrieval process.

The nucleotide sequences are then retrieved from their respective storage labs, including synthetic DNA computing lab 1 (210), lab 2 (212), and lab 3 (214), and aggregated into a single data stream. The DNA decoding engine converts the nucleotide sequences back into their original binary form using optimized algorithms that ensure accuracy and error correction. Techniques such as Reed-Solomon error correction, checksum validation, and machine learning-driven anomaly detection are applied to identify and resolve any inconsistencies or errors in the retrieved sequences. If anomalies are detected, the system triggers fault-recovery protocols, including retrieving redundant copies from alternative storage labs or re-initiating the retrieval process to ensure data integrity. Once the binary data is reconstructed, it is decrypted using the original encryption keys stored within the smart contracts, ensuring that only authorized users can access the complete and accurate version of the data.

The coupling of multiple DNA storage labs also supports collaborative access and secure data sharing across multiple entities. For example, financial institutions, government agencies, or research organizations may leverage the system to securely manage and share subsets of data stored in synthetic DNA. The smart contracts enforce fine-grained access control rules that specify which entities are authorized to retrieve specific subsets of the stored data. For instance, a bank may retrieve financial details from lab 1 (210), while a research institution accesses only non-sensitive metadata from lab 3 (214). This selective access control capability ensures that sensitive information remains protected while enabling efficient collaboration and data sharing in multi-entity environments.

The figure further emphasizes the role of the blockchain-based distributed ledger in maintaining transparency, traceability, and security across the DNA storage ecosystem. Each operation, including data insertion, storage allocation, retrieval, and validation, is recorded immutably in the ledger. The blockchain ledger not only provides an auditable record of all transactions but also prevents unauthorized tampering or access to the data. For example, the ledger may include cryptographic fingerprints of the nucleotide sequences, storage location metadata, access permissions, and validation logs, ensuring accountability and trustworthiness for all stakeholders interacting with the system.

In conclusion, FIG. 2 illustrates the integration and coupling of multiple synthetic DNA computing labs within a secure, scalable, and fault-tolerant storage system. The DNA computing infrastructure 128 dynamically orchestrates the distribution of nucleotide sequences across synthetic DNA labs 210, 212, and 214 based on data sensitivity and security requirements. The system ensures redundancy, fault tolerance, and selective access control while enabling seamless aggregation and retrieval of stored data through blockchain-governed smart contracts. This innovative architecture combines generative AI, blockchain governance, and advanced DNA encoding to revolutionize secure digital data management, offering unparalleled durability, scalability, and security for long-term data storage and retrieval.

FIG. 3 provides a highly detailed representation of the system's ability to securely link segmented data or information to a chain of smart contracts, enabling precise control, management, and retrieval of sensitive and non-sensitive data using blockchain-based distributed ledgers and synthetic DNA computing infrastructures. This figure highlights the interaction between digital data, smart contracts, and the DNA-based storage infrastructure, showing how the system ensures that information is processed, encoded, stored, and governed with unparalleled security, traceability, and resilience. The process begins when digital data, such as a check image 101, containing sensitive details like an ACH routing/transit number 102, an ABA routing number 104, an account number 106, and a check number 108, is provided to the system for secure storage. This data, which consists of both confidential and non-confidential components, undergoes a series of operations to ensure it is appropriately segmented, encrypted, and stored based on its sensitivity. The system leverages generative AI to analyze and classify the check image into distinct data subsets based on the confidentiality, importance, and structure of the information.

Once the information is classified, the generative AI engine segments the digital input into multiple logical groups. For example, the ACH routing/transit number 102 and the ABA routing number 104 are identified as highly sensitive financial data, requiring strict encryption and restricted storage access. In contrast, non-sensitive details, such as the check number 108, may be handled with standard encryption protocols to optimize processing efficiency. The segmentation process ensures that each subset of data can be independently managed and protected while adhering to varying levels of confidentiality and security requirements. Each segmented group of data is then associated with its own dedicated smart contract, which is dynamically generated by the smart contract generation engine. The smart contracts, shown in the figure as Smart Contract 1, Smart Contract 2, Smart Contract 3, Smart Contract 4, and Smart Contract N, serve as automated governance entities that define the rules and conditions for managing the lifecycle of each group of information. These smart contracts include critical metadata such as encryption protocols, access control policies, storage location identifiers, validation rules, and user-specific authorization tokens.

The blockchain-based distributed ledger 300 serves as the central repository for all smart contracts, providing a tamper-proof and transparent record of their creation, updates, and enforcement. Each smart contract is immutably stored on the blockchain ledger, ensuring that the rules governing the storage and retrieval of segmented data cannot be altered or tampered with. For instance, the smart contract associated with the ACH routing/transit number 102 may include rules specifying the use of asymmetric encryption algorithms, biometric-based multi-factor authentication, and secure geo-location-specific DNA storage requirements. These rules dictate how the encrypted and encoded data will be stored in the DNA computing infrastructure, ensuring compliance with security and operational policies. Similarly, the smart contract linked to less sensitive information, such as the check number 108, may enforce less stringent encryption requirements but still adhere to controlled access policies to maintain system integrity.

Once the smart contracts are generated and stored on the blockchain, the segmented data subsets are encrypted using dynamic encryption protocols specified in the corresponding smart contracts. The encryption engine applies cryptographic methods, such as symmetric or asymmetric encryption, based on the sensitivity classification of each data group. For example, the account number 106 may be encrypted using asymmetric cryptography, with encryption keys generated dynamically using the user's biometric data, device-specific identifiers, and cryptographic random number generation techniques. These encryption keys are stored securely within the blockchain-linked smart contracts to ensure they remain accessible only to authorized entities during retrieval. The encrypted data is then encoded into synthetic DNA sequences by the DNA encoding engine. This engine converts the binary representation of the encrypted data into nucleotide sequences composed of adenine (A), thymine (T), guanine (G), and cytosine (C). Each nucleotide sequence corresponds to one of the classified groups, ensuring that the data subsets remain logically distinct even in their encoded DNA form.

The synthetic DNA computing infrastructure 302, shown in the figure, serves as the physical storage layer for the encoded nucleotide sequences. Each group of data is stored in synthetic DNA strands that are distributed across multiple DNA storage facilities, ensuring redundancy, fault tolerance, and durability. The linkage between the DNA-encoded data and the blockchain-based smart contracts ensures that each group can be individually managed, accessed, and validated based on the rules defined in the corresponding smart contract. For example, Smart Contract 1 may govern the nucleotide sequence corresponding to the ACH routing/transit number 102, specifying that it must be stored in a highly secure DNA lab with advanced physical and digital safeguards. Smart Contract 2 may govern the nucleotide sequence for the account number 106, enforcing strict validation rules for any retrieval requests. Each smart contract ensures that the data subsets are stored in accordance with their sensitivity classification and can only be accessed by entities authorized through the multi-layered validation processes defined within the contracts.

The figure also highlights the critical role of the blockchain-based distributed ledger 300 in orchestrating and securing interactions between the synthetic DNA computing infrastructure 302 and the system's smart contract governance layer. The blockchain ledger maintains a verifiable and immutable record of all transactions, including the segmentation, encryption, encoding, and storage of data subsets. When an entity submits a request to retrieve specific data stored in the DNA infrastructure, the system queries the blockchain ledger to identify the relevant smart contract governing the requested data. This smart contract validates the retrieval request by enforcing multi-factor authentication, which may include biometric inputs such as fingerprints or facial recognition, device-specific tokens, and cryptographic authorization checks. Once validated, the system identifies the storage location of the nucleotide sequence within the synthetic DNA computing infrastructure and retrieves the corresponding DNA-encoded data.

The retrieval process involves decoding the nucleotide sequences back into their original binary form using the DNA decoding engine. The system applies advanced error correction and validation techniques, such as Reed-Solomon error correction, checksum validation, and anomaly detection algorithms, to ensure the accuracy, integrity, and completeness of the decoded data. If any anomalies are detected during decoding, the system retrieves redundant copies of the nucleotide sequences from alternative storage facilities within the synthetic DNA computing infrastructure 302 to reconstruct the data. Once the data is successfully decoded, it is decrypted using the encryption keys stored within the blockchain-linked smart contracts. The decrypted data subsets are then aggregated to reconstruct the original input, such as the check image 101, ensuring that the output matches the data initially submitted by the user.

The modular architecture represented in FIG. 3 demonstrates how the system seamlessly integrates generative AI, blockchain-based smart contracts, and synthetic DNA storage infrastructures to securely manage digital information. By segmenting data into logical groups and linking each group to a dedicated smart contract, the system ensures fine-grained control, transparency, and security throughout the data lifecycle. The blockchain ledger 300 acts as the authoritative record for managing smart contracts and tracking all operations, while the synthetic DNA computing infrastructure 302 provides long-term, fault-tolerant storage for the encoded nucleotide sequences. This architecture enables the system to store vast amounts of sensitive and non-sensitive data in a highly secure, scalable, and resilient manner, addressing the growing need for advanced data management solutions.

In conclusion, FIG. 3 illustrates the comprehensive process by which segmented data is securely managed, encrypted, encoded, and stored in synthetic DNA computing infrastructures under the governance of blockchain-based smart contracts. The linkage of each group of data to a dedicated smart contract ensures strict access controls, validation rules, and storage policies tailored to the sensitivity of the data. The blockchain ledger 300 provides transparency, immutability, and accountability, while the synthetic DNA computing infrastructure 302 offers unparalleled durability, redundancy, and storage capacity. This innovative system revolutionizes secure data management, combining generative AI for intelligent classification, blockchain governance for rule enforcement, and synthetic DNA for long-term data storage. By integrating these advanced technologies, the system ensures that sensitive and non-sensitive information remains secure, accessible, and verifiable across its entire lifecycle.

FIG. 4 provides a comprehensive depiction of the encryption and decryption as a service process within the architecture for orchestrating synthetic DNA computing as a secure data storage system leveraging blockchain-based smart contracts, generative AI classification, and DNA synthesis infrastructures. The figure illustrates the intricate interaction between a requesting entity, the encryption and storage infrastructure, blockchain-based smart contracts, and the DNA computing infrastructure, showing the end-to-end flow of securing and retrieving digital information. It highlights how the system ensures the confidentiality, integrity, and controlled accessibility of highly sensitive data using cryptographic mechanisms and automated smart contracts to govern the operations of encryption, storage, and decryption.

The process begins with a third-party requester 400, which can be any external entity such as a bank, research institution, or authorized user, initiating a request to retrieve specific nucleotide sequences corresponding to data previously stored within the system. These sequences represent encrypted digital data that has been converted into synthetic DNA strands and stored across secure DNA computing infrastructures. Upon receiving the request, the system generates a response for the synthetic nucleotide sequence 402, which acknowledges the request while verifying its authenticity against pre-established conditions. The verification process requires the requester to fulfill multiple validation criteria, such as providing biometric authentication, device-specific tokens, and cryptographic authorization keys. These validations ensure that only authorized entities can proceed further in the process, eliminating the possibility of unauthorized access.

The system subsequently engages the DNA computing infrastructure 404, which serves as the operational core for managing encryption, storage, and retrieval of nucleotide sequences. Before storage, digital data must be encrypted using cryptographic methods defined in the smart contracts associated with each data group. These smart contracts, stored immutably on a blockchain ledger, govern the encryption and decryption processes by specifying the encryption protocols, access control rules, and decryption mechanisms applicable to the data. For instance, if the requester is seeking access to highly sensitive data, such as biometric credentials or financial information, the corresponding smart contract will dictate the use of asymmetric encryption protocols to ensure that only entities possessing the private decryption key can access the data. This asymmetric encryption process generates secure cryptographic keys that are dynamically created using a combination of user biometrics, device-specific attributes, and cryptographic random number generation algorithms. The encryption keys and associated metadata are linked to the data group's smart contract, ensuring that the keys are protected and only accessible during an authorized decryption process.

Once the encryption process is complete, the system encodes the encrypted binary data into a synthetic DNA sequence. This is achieved by converting the binary representation of the encrypted information into nucleotide sequences consisting of combinations of adenine (A), thymine (T), guanine (G), and cytosine (C). The resulting DNA sequence is represented as a FASTA file, which serves as a standardized format for storing nucleotide sequences in DNA-based storage systems. The FASTA file contains the encoded representation of the encrypted data, ensuring that the digital content can be efficiently synthesized, stored, and retrieved. The encoded DNA sequence is then directed to a designated DNA synthesis infrastructure 414, where it is synthesized into physical DNA strands. The smart contracts define the specific storage locations within the DNA synthesis infrastructure, ensuring that highly sensitive data is stored in secure, high-priority DNA labs with enhanced physical and environmental safeguards. For instance, the smart contract might require that certain nucleotide sequences be stored in geographically dispersed facilities to provide redundancy and fault tolerance, protecting the data against localized failures or physical degradation.

The figure also highlights the blockchain-based distributed ledger 406, which plays a critical role in orchestrating and securing the encryption and storage processes. Each smart contract is stored immutably on the blockchain ledger, providing a transparent and tamper-proof record of all operations performed on the data. The smart contracts contain key information such as storage locations, encryption keys, access validation rules, and metadata linking the nucleotide sequences to their encrypted digital equivalents. This ensures that every action, including data encryption, storage, and retrieval, is traceable and verifiable, providing an auditable trail for compliance and security purposes. The blockchain ledger updates automatically during each step of the process, recording events such as the generation of encryption keys, the storage of DNA-encoded data, and the invocation of smart contracts for retrieval.

The decryption process begins when the requester's access request is validated through the invocation of Smart Contract A 408. The smart contract serves as an automated governance mechanism that enforces the rules and conditions for decryption. For example, the smart contract might require the requester to undergo biometric authentication, such as fingerprint verification or facial recognition, in combination with device-specific validation tokens. If the requester satisfies all predefined conditions, the smart contract authorizes access to the encrypted nucleotide sequences stored in the DNA synthesis infrastructure. The system retrieves the relevant DNA sequences from their designated storage locations and decodes them using the DNA decoding engine. This decoding process involves translating the nucleotide sequences back into binary form, ensuring that the original encrypted data is accurately reconstructed. The decoding engine employs advanced error correction techniques, such as Reed-Solomon error correction, parity checks, and anomaly detection algorithms, to validate the integrity of the retrieved sequences and resolve any errors that may have occurred during storage or retrieval.

Once the nucleotide sequences are successfully decoded, the system proceeds with the decryption process. The encrypted data is decrypted using the cryptographic keys specified in the smart contracts. These keys, which were dynamically generated during the encryption process, ensure that only authorized entities can reconstruct the original digital content. For example, if the encrypted data was protected using asymmetric encryption, the private decryption key must be provided to access the decrypted content. The decryption engine applies the appropriate cryptographic algorithms to convert the encrypted binary data into its original, human-readable form, such as a document, image, or file. This ensures that the requester receives the correct and complete version of the requested data while maintaining its confidentiality and integrity.

The final step in the process involves aggregating the decrypted data and securely delivering it to the requester 400. The system ensures that all validation, decoding, and decryption steps comply with the rules defined in the smart contracts and are recorded immutably on the blockchain ledger. This immutable record provides a transparent and auditable trail of all actions performed during the encryption, storage, and decryption processes, ensuring accountability and compliance with security policies. Additionally, the system logs information such as the requester's identity, the specific data accessed, the storage location of the nucleotide sequences, and the time of access, further enhancing the security and traceability of the process.

FIG. 4 highlights the robust and interconnected architecture of the encryption and decryption as a service system, showcasing how digital data is encrypted, encoded, stored, and retrieved securely using synthetic DNA computing infrastructures and blockchain-governed smart contracts. The integration of cryptographic techniques, DNA encoding, and distributed ledger technology ensures that sensitive data remains confidential, tamper-proof, and accessible only to authorized entities. The use of FASTA files to represent nucleotide sequences provides a standardized format for encoding and decoding DNA-based data, while the blockchain ledger ensures transparency, verifiability, and accountability for all operations. By orchestrating these components seamlessly, the system revolutionizes data security and storage, offering a scalable, fault-tolerant, and highly secure solution for managing digital information in synthetic DNA infrastructures.

FIG. 5 provides an in-depth representation of the encryption flow as a service, illustrating how the system encrypts segmented digital data before securely storing it in synthetic DNA computing infrastructures. This figure highlights the detailed orchestration of encryption, the dynamic generation of cryptographic keys, the enforcement of access control rules, the involvement of blockchain-based smart contracts, and the subsequent encoding of encrypted data into nucleotide sequences. These processes ensure the confidentiality, integrity, and security of digital information as it is converted into DNA-based storage. The flow begins with a user or entity, depicted as 500, submitting a digital input to the system. This input may consist of highly sensitive data such as a check image, financial transaction records, biometric credentials, or other forms of confidential information. The system receives the input data and triggers a generative AI-driven classification engine 502 to process, analyze, and segment the digital information into multiple subsets based on sensitivity and confidentiality.

The generative AI engine examines the content and context of the input data to determine the sensitivity level of each subset. For example, in the case of a check image, the account number, routing number, and signature may be identified as highly sensitive components requiring stringent encryption protocols, while less critical portions, such as printed text or background elements, are classified as moderately sensitive or non-sensitive. The AI engine dynamically segments the data into distinct logical groups and assigns a sensitivity score to each group, ensuring that highly sensitive subsets are treated with greater security controls throughout the encryption, storage, and retrieval processes. This segmentation enables the system to enforce fine-grained security policies tailored to the varying sensitivity levels of each subset.

After classification, the system initiates the encryption process for each segmented group of data, utilizing an encryption engine 504 to apply cryptographic algorithms as specified by the system's smart contract layer. Prior to encrypting the data, the encryption engine generates unique encryption keys for each segment using a combination of biometric inputs 508, device-specific parameters, and cryptographic random number generation. For example, the user may provide a biometric scan such as a fingerprint, iris scan, or facial recognition to initiate the encryption process. The biometric data is securely processed and used as an input to the key generation algorithm, ensuring that the generated encryption keys are bound to the user's unique identity.

Additional device-specific attributes, such as hardware tokens, unique device identifiers, and IP addresses, are incorporated into the encryption key generation process to further enhance the uniqueness and security of the keys. This multi-layered approach ensures that the encryption keys are highly secure, resistant to brute-force attacks, and can only be accessed or reconstructed under the proper validation conditions.

The encryption engine 504 encrypts each group of segmented data using the dynamically generated keys. For highly sensitive subsets, asymmetric encryption protocols such as RSA or elliptic curve cryptography (ECC) are applied, ensuring that the encrypted data can only be decrypted using the corresponding private key. These asymmetric encryption techniques provide an additional layer of security, particularly for data that requires strong protection against unauthorized access. For moderately sensitive subsets, symmetric encryption algorithms such as AES (Advanced Encryption Standard) may be used to balance security and processing efficiency. Each encrypted subset is stored temporarily in the encryption engine while the system prepares for the subsequent DNA encoding process.

Once the segmented data has been encrypted, it is passed to the DNA encoding engine 510, where the encrypted binary representation of the data is converted into synthetic DNA sequences. The encoding engine uses advanced mapping algorithms to translate the binary content into combinations of the four fundamental nucleotide bases: adenine (A), thymine (T), guanine (G), and cytosine (C). For example, the encrypted binary representation of the account number might be converted into a nucleotide sequence such as "AATGCCGGTTAACCTTAGGGAACCT." Each nucleotide sequence corresponds to a specific segment of the encrypted data, preserving the logical separation established during the earlier classification stage. The encoded nucleotide sequences are then prepared for secure storage in synthetic DNA synthesis infrastructures.

The blockchain-based distributed ledger 506 serves as a critical governance layer throughout the encryption process, ensuring that all operations are immutably recorded and enforced according to predefined smart contracts. Each smart contract governs the encryption, storage, and retrieval of its corresponding data subset, specifying rules such as the encryption algorithms to be used, the access control requirements, and the storage conditions. For example, the smart contract associated with the routing number might enforce asymmetric encryption, multi-factor authentication, and storage in a high-security DNA lab with redundant backups. The smart contracts also include metadata such as cryptographic fingerprints of the encrypted data, encryption key identifiers, user-specific validation rules, and storage location parameters. These smart contracts are stored immutably on the blockchain ledger, providing a transparent, tamper-proof record of all encryption-related activities.

The encrypted nucleotide sequences are transferred to the DNA synthesis infrastructure, where they are synthesized into physical DNA strands for secure, long-term storage. The smart contracts dictate the exact storage locations for each nucleotide sequence, ensuring that highly sensitive data is stored in secure, geographically distributed DNA labs with advanced physical and digital safeguards. For example, sequences representing the user's biometric data or financial credentials may be directed to high-security labs with restricted access protocols, while less sensitive sequences may be stored in standard facilities. The blockchain ledger is updated to reflect the encryption status, the storage locations, and the cryptographic metadata associated with each nucleotide sequence, ensuring that all processes remain transparent, traceable, and verifiable.

The figure also demonstrates how smart contracts play a pivotal role in linking the encrypted nucleotide sequences to their corresponding encryption keys and metadata. Each smart contract serves as an automated enforcement mechanism, ensuring that the encryption process adheres to the predefined rules for data security, access control, and compliance. For instance, a retrieval request for a nucleotide sequence must invoke the corresponding smart contract to validate the requester's identity, enforce access permissions, and provide the decryption key required to reconstruct the original data. This ensures that unauthorized entities cannot decrypt or tamper with the encrypted data, even if they gain access to the nucleotide sequences stored in the DNA infrastructure.

The encryption process concludes with the blockchain ledger recording a comprehensive audit trail of all operations, including the generation of encryption keys, the encryption of data subsets, the storage of nucleotide sequences, and the enforcement of smart contract rules. This immutable record ensures accountability, security, and compliance, providing organizations with verifiable proof of how sensitive data is encrypted, stored, and managed within the system. The integration of generative AI for classification, dynamic encryption for security, blockchain for governance, and synthetic DNA for storage creates a highly secure, scalable, and resilient solution for protecting and managing sensitive digital information.

In conclusion, FIG. 5 provides a detailed depiction of the encryption flow for segmented data, showing how digital information is analyzed, classified, encrypted, and encoded into synthetic DNA sequences under the governance of blockchain-based smart contracts. The figure highlights the system's ability to dynamically generate encryption keys using biometric and device-specific inputs, apply tailored encryption algorithms based on data sensitivity, and ensure secure storage in DNA synthesis infrastructures. The blockchain ledger serves as the immutable governance layer, linking encrypted nucleotide sequences to their smart contracts and ensuring transparency, traceability, and accountability throughout the process. By combining encryption, blockchain governance, and DNA encoding, the system provides an advanced solution for securely managing sensitive data with unprecedented levels of security, durability, and reliability.

FIG. 6 presents a detailed and expanded depiction of the authorization process for retrieving encrypted and DNA-encoded data stored within the synthetic DNA computing infrastructure. This figure meticulously outlines how the system ensures that only validated, authenticated, and properly entitled entities are granted access to nucleotide sequences that represent the encrypted form of the original input data. The authorization process relies on a multi-faceted validation approach, blockchain-based governance through smart contracts, and the integration of synthetic DNA decoding infrastructures to securely retrieve, decrypt, and reconstruct the original digital data. The entire flow prioritizes security, access control, and transparency, ensuring that data remains protected, accurate, and tamper-proof throughout the retrieval process.

The process begins when a requester 600, which can be an external entity such as a financial institution, government agency, or authorized user, submits a formal request to retrieve specific nucleotide sequences from the system. These nucleotide sequences correspond to encrypted digital information previously encoded into synthetic DNA. The request is transmitted to the system and triggers an immediate validation process that ensures the requester's identity, legitimacy, and access entitlements comply with pre-established security and governance protocols. At this initial stage, the system requires multiple levels of authentication to verify the requester. User-specific biometric data 604, such as fingerprint scans, facial recognition data, iris scans, or voice signatures, are captured and processed to confirm the requester's identity. For example, when a fingerprint scan is submitted, the system compares it against a previously recorded reference stored securely in the blockchain-linked smart contracts. This biometric validation ensures that the request is originating from an authorized user.

In addition to biometrics, the system performs device-specific validation to confirm that the request is originating from an authorized device. Device parameters such as unique hardware tokens, MAC addresses, geolocation data, and IP addresses are analyzed to verify the legitimacy of the device. If the device does not match pre-registered profiles associated with the requester's account, the system will deny access, preventing unauthorized devices from initiating retrieval attempts. These multi-factor authentication checks ensure that even if biometric data is compromised, the presence of device-specific validation creates an additional layer of security. The integration of both biometric and device-based inputs guarantees that only legitimate, authenticated users operating trusted devices can access the DNA-encoded data.

Once the user and device validations are successfully completed, the system invokes a corresponding smart contract 608 linked to the requested data subset. The smart contracts are stored immutably within the blockchain ledger 610, where they serve as automated governance mechanisms that enforce access control policies, validation rules, and storage parameters. Each smart contract is dynamically generated during the data classification and encryption stages and contains specific rules governing the retrieval and decryption processes. For example, the smart contract associated with highly sensitive biometric data may require multi-factor authentication, asymmetric encryption validation, and retrieval from a high-security DNA storage location. In contrast, a smart contract linked to less critical information, such as metadata or non-sensitive records, may enforce simplified access conditions. These smart contracts are queried and executed as part of the validation process, ensuring that all access attempts comply with the predefined security rules and authorization policies.

The blockchain ledger 610 acts as the immutable governance layer that records and validates all operations involving the retrieval request, including the invocation of smart contracts, user authentication, and data access decisions. The ledger contains metadata linking the requested nucleotide sequences to their corresponding encryption keys, access conditions, and storage locations within the DNA infrastructure. Once the smart contract successfully validates the requester's entitlement to access the data, the blockchain ledger authorizes the system to retrieve the corresponding nucleotide sequences from the synthetic DNA computing infrastructure 612. The retrieval process begins with the system querying the DNA storage locations specified in the smart contract to identify the correct facility where the encrypted nucleotide sequences reside. These storage locations may include geographically distributed synthetic DNA labs designed to provide redundancy, fault tolerance, and physical security. For instance, highly sensitive nucleotide sequences may be stored in secure DNA facilities equipped with restricted access controls, environmental safeguards, and multi-tiered encryption layers, ensuring their protection against tampering or unauthorized access.

The retrieved nucleotide sequences are then passed to the DNA decoding engine 614, which initiates the process of converting the DNA-encoded data back into its original encrypted binary form. The DNA decoding engine applies optimized algorithms to reverse the encoding process that initially mapped the binary data into nucleotide sequences. This decoding process incorporates advanced error correction protocols, such as Reed-Solomon error correction, anomaly detection algorithms, and redundancy checks, to validate the integrity and accuracy of the retrieved sequences. If anomalies, errors, or inconsistencies are detected during decoding, the system triggers a fault-tolerance mechanism to retrieve redundant copies of the nucleotide sequences stored in alternative DNA labs. The fault-tolerance mechanism ensures that the data remains intact, accurate, and complete, even if minor physical degradation or storage inconsistencies occur in the primary DNA storage location. This redundancy eliminates the risk of data corruption or loss, ensuring high reliability in the reconstruction process.

Once the DNA decoding engine reconstructs the nucleotide sequences into their encrypted binary form, the system proceeds to decrypt the data using the cryptographic keys specified in the smart contract. These keys, which were dynamically generated during the encryption process, are retrieved securely from the blockchain-linked smart contracts. For example, if asymmetric encryption was applied to the data, the system uses the corresponding private key to decrypt the binary representation into its original plaintext form. The decryption engine validates that the requester has satisfied all access control rules, such as biometric verification, device validation, and compliance with smart contract conditions, before initiating the decryption process. This ensures that unauthorized entities cannot decrypt or reconstruct the original digital information, even if they gain access to the nucleotide sequences.

The decrypted data, now restored to its original form, is reassembled and securely delivered to the requester 600. Throughout the process, the blockchain ledger 610 updates its records to log all operations performed during the validation, retrieval, decoding, and decryption stages. This log includes information such as the requester's identity, the smart contract invoked, the time of access, the validation steps performed, and the specific data subsets retrieved. By maintaining an immutable and verifiable audit trail, the blockchain ledger ensures transparency, accountability, and compliance with security and governance protocols. This audit trail can be queried to verify the legitimacy of all operations, detect unauthorized attempts, and provide evidence of compliance with regulatory or operational requirements.

FIG. 6 underscores the robust and multi-layered security architecture employed by the system to govern the retrieval and decryption of data stored in synthetic DNA infrastructures. The combination of biometric validation, device-specific checks, blockchain-based smart contracts, and DNA decoding ensures that only authenticated, entitled, and validated entities can access and reconstruct the stored data. The integration of error correction protocols and redundancy mechanisms further enhances the reliability and resilience of the system, ensuring that the retrieved data remains accurate and intact, even in the presence of minor storage anomalies. By leveraging blockchain technology to govern access control and maintain an immutable audit trail, the system guarantees that all retrieval attempts are transparent, traceable, and tamper-proof. The decoding and decryption processes, which operate seamlessly under the governance of smart contracts, provide an additional layer of protection to ensure that sensitive data remains secure, confidential, and resilient to unauthorized access. FIG. 6 exemplifies the system's capability to manage secure data access while maintaining strict validation, fault tolerance, and transparency, offering a revolutionary approach to data retrieval and management within synthetic DNA storage environments.

FIG. 7 presents an intricate and exhaustive depiction of the system architecture that enables the secure classification, encryption, encoding, storage, retrieval, and governance of digital data within a synthetic DNA computing infrastructure. The figure highlights the precise interaction between various interconnected components, including generative AI engines, encryption engines, DNA encoding and decoding engines, smart contract management, and blockchain-based governance mechanisms. Together, these components create a multi-layered framework capable of transforming digital data into synthetic DNA-encoded representations, securely managing it throughout its lifecycle, and ensuring verifiable, authorized access under stringent validation controls. The architecture depicted in FIG. 7 integrates advanced technologies and algorithms to address every stage of data processing, providing scalability, reliability, and unmatched security.

The process begins with a user or entity initiating the submission of digital data into the system. The data can include a variety of forms, such as financial records, check images, biometric credentials, multimedia files, or sensitive institutional datasets. The generative AI engine 700 is the first component to interact with the input data. It employs advanced deep learning models trained on vast datasets to analyze, process, and parse the input into logical segments. This segmentation allows the system to identify and classify individual components of the input data based on contextual sensitivity, confidentiality requirements, and regulatory guidelines. For instance, if the input data is a check image, the generative AI engine identifies the account number, routing number, and signature as distinct components and classifies them as highly sensitive elements requiring enhanced security protocols. Other portions, such as check numbers or metadata, may be assigned lower sensitivity classifications, allowing for a more efficient encryption and storage process. The generative AI ensures that data is dynamically segmented in a way that supports the application of fine-grained security policies tailored to the sensitivity of each component.

The generative AI engine 700 communicates its analysis to the information classification engine 702, which refines the classification of the segmented components and assigns them sensitivity scores based on pre-established rules and contextual analysis. These scores serve as inputs to determine the level of encryption, storage location, and access control rules to be applied to each data group. The classification engine also interfaces with other components to ensure compliance with organizational policies and regulatory mandates, such as GDPR or HIPAA, further enhancing the adaptability of the system. Once the classification process is complete, the segmented data subsets are forwarded to the encryption engine 704, where they undergo dynamic encryption to ensure confidentiality and protection against unauthorized access.

The encryption engine 704 generates unique cryptographic keys for each classified data subset. These keys are created using multiple factors, including user-provided biometric inputs, device-specific parameters, and cryptographic random number generation techniques. For instance, during the encryption process, the system may require the user to submit biometric authentication, such as a fingerprint scan, iris scan, or facial recognition data. The biometric data serves as an input to the key generation process, ensuring that the encryption keys are uniquely tied to the user's identity. Additionally, device-specific attributes such as hardware tokens, IP addresses, MAC addresses, and geolocation data are combined with the biometric inputs to further strengthen the uniqueness and unpredictability of the encryption keys. These dynamically generated keys are used to apply encryption algorithms to the segmented data. For highly sensitive data subsets, the encryption engine employs asymmetric encryption protocols such as RSA or elliptic curve cryptography (ECC), which provide strong protection by using public and private key pairs. For data subsets with lower sensitivity, symmetric encryption algorithms like AES are applied to achieve computational efficiency without compromising security.

The encrypted data subsets are then transferred to the DNA encoding engine 706, where they are converted into synthetic DNA sequences. The encoding process involves mapping the encrypted binary representation of the data into combinations of the four nucleotide bases—adenine (A), thymine (T), guanine (G), and cytosine (C)—that form the building blocks of DNA. For example, an encrypted binary string such as "10101011" is translated into a nucleotide sequence like "AATTGGCC," which can be synthesized into physical DNA strands for long-term storage. The DNA encoding engine applies optimization algorithms to ensure that the generated nucleotide sequences are compact, efficient, and resilient to errors. Each encoded sequence corresponds to a specific encrypted data subset, preserving the logical separation of the classified components established during the initial stages of the process. The nucleotide sequences are saved in standardized FASTA files, which serve as the output of the DNA encoding process and facilitate seamless integration with DNA synthesis infrastructures.

The encoded nucleotide sequences are stored within the synthetic DNA computing infrastructure 714. These infrastructures consist of secure DNA storage labs equipped with the capabilities to synthesize, store, and maintain the physical DNA strands that encode the encrypted data. The storage locations for each nucleotide sequence are determined based on the sensitivity classification of the corresponding data subset and are governed by rules specified in dynamically generated smart contracts. The smart contract generation engine 708 creates these contracts for each group of data, defining the encryption rules, access control policies, storage parameters, and validation conditions. For example, a smart contract associated with highly sensitive biometric data may mandate multi-factor authentication, secure storage in geographically dispersed DNA labs, and strict validation checks during retrieval. Each smart contract is immutably recorded on the blockchain-based distributed ledger 710, where it serves as the authoritative governance mechanism for managing and verifying all operations performed on the data.

The blockchain-based distributed ledger 710 acts as a transparent, tamper-proof, and verifiable record of all events within the system, including encryption, storage, access attempts, and retrieval operations. Each smart contract is stored immutably on the blockchain, ensuring that the rules governing the lifecycle of the data cannot be altered or manipulated. The ledger records metadata such as cryptographic fingerprints, storage locations, encryption parameters, access validation conditions, and the identities of users or entities interacting with the system. This provides an immutable audit trail that enhances accountability, security, and compliance.

When an authorized entity submits a retrieval request, the information processing engine 712 interacts with the smart contracts to validate the requester's identity and access entitlements. The validation process involves multiple layers of authentication, including user-provided biometric data, device-specific checks, and cryptographic token validation. If the requester satisfies the access control rules specified in the smart contract, the system retrieves the corresponding nucleotide sequences from the DNA storage infrastructure. The sequences are passed to the DNA decoding engine 716, where they are converted back into their encrypted binary form. The decoding process includes error correction protocols, such as Reed-Solomon error correction and anomaly detection algorithms, to ensure the integrity and accuracy of the reconstructed data. The anomaly detection engine 718 monitors for inconsistencies or errors during the decoding process and triggers fault-tolerance mechanisms to retrieve redundant copies of the nucleotide sequences if necessary.

Once decoded, the encrypted binary data is decrypted using the cryptographic keys specified in the smart contract. The decryption process restores the original digital data, such as a financial document, image, or biometric file, which is securely delivered to the requester. Throughout this entire process, the blockchain ledger updates its records to log all validation, retrieval, decoding, and decryption events, ensuring full traceability and transparency.

FIG. 7 illustrates a sophisticated, multi-layered system architecture that seamlessly integrates generative AI classification, dynamic encryption, DNA encoding and decoding, blockchain governance, and smart contract automation to provide a secure and efficient solution for managing digital data in synthetic DNA infrastructures. This architecture ensures that data remains confidential, resilient, and accessible only to authorized entities while leveraging blockchain technology to maintain an immutable and verifiable audit trail of all operations. The system revolutionizes the secure storage, retrieval, and management of sensitive digital information, offering unparalleled durability, traceability, and protection within synthetic DNA computing environments.

Pseudocode exemplars for implementing various aspects of this disclosure are set forth below with explanations for reference. In particular, the pseudocode for implementing the invention that orchestrates synthetic DNA computing as a service (DNAaaS) involves multiple components, including data classification using generative AI, smart contract generation and management, encryption and encoding of digital information into synthetic DNA sequences, secure data storage, retrieval, and anomaly detection. Below is the pseudocode, followed by a detailed explanation of each aspect.

```
1. GENERATIVE AI DATA CLASSIFICATION
function classify_data(input_data):
  sensitivity_groups = { }
  classified_data = analyze_with_AI(input_data) # Use generative AI
to analyze sensitivity
  for group in classified_data:
    sensitivity = determine_sensitivity(group)
    sensitivity_groups[group] = sensitivity
  return sensitivity_groups
2. SMART CONTRACT GENERATION
function generate_smart_contracts(sensitivity_groups):
  smart_contracts = { }
```

-continued

```
  for group, sensitivity in sensitivity_groups.items( ):
    smart_contract = create_smart_contract(group, sensitivity)
    store_in_blockchain(smart_contract)
    smart_contracts[group] = smart_contract
  return smart_contracts
3. ENCRYPTION OF DATA SUBSETS
function encrypt_data(classified_data, smart_contracts):
  encrypted_data = { }
  for group, contract in smart_contracts.items( ):
    encryption_key = generate_encryption_key(contract)
    encrypted_data[group] = encrypt(group, encryption_key)
    save_encryption_metadata(group, encryption_key, contract)
  return encrypted_data
4. ENCODING DATA INTO DNA SEQUENCES
function encode_to_DNA(encrypted_data):
  dna_sequences = { }
  for group, encrypted_content in encrypted_data.items( ):
    nucleotide_sequence = binary_to_nucleotide(encrypted_content)
    dna_sequences[group] = nucleotide_sequence
    store_in_DNA_lab(group, nucleotide_sequence)
  return dna_sequences
5. DATA STORAGE IN DISTRIBUTED DNA LABS
function store_in_DNA_lab(group, nucleotide_sequence):
  dna_lab = assign_storage_lab(group) # Based on rules in smart
  contract
  store_in_lab(dna_lab, nucleotide_sequence)
  record_storage_in_blockchain(group, dna_lab)
6. DATA RETRIEVAL WITH VALIDATION
function retrieve_data(request, user_biometrics, device_info):
  validate_request(request, user_biometrics, device_info)
  dna_sequences = { }
  for group in request:
    dna_lab = get_storage_lab_from_blockchain(group)
    nucleotide_sequence = retrieve_from_lab(dna_lab)
    dna_sequences[group] = nucleotide_sequence
  decoded_data = decode_from_DNA(dna_sequences)
  return decrypted_data(decoded_data)
7. DECODING DNA SEQUENCES
function decode_from_DNA(dna_sequences):
  decoded_data = { }
  for group, sequence in dna_sequences.items( ):
    binary_data = nucleotide_to_binary(sequence)
    decoded_data[group] = binary_data
  return decoded_data
8. ANOMALY DETECTION AND CORRECTION
function detect_and_correct_anomalies(retrieved_data):
  for group, data in retrieved_data.items( ):
    if not validate_data_integrity(data):
      corrected_data = reinitiate_retrieval(group)
      retrieved_data[group] = corrected_data
  return retrieved_data
```

The first function, 'classify_data', begins the process by utilizing a generative AI engine to analyze the input data, such as text, images, or videos. The AI identifies and classifies different components of the data based on their sensitivity and confidentiality levels. For example, if a check image is submitted, the AI engine identifies portions like the account number, routing number, and signature, and assigns each to a sensitivity group. These sensitivity groups are then used to apply tailored encryption and storage protocols later in the system.

The second function, 'generate_smart_contracts', creates a smart contract for each classified group of data. Each smart contract includes rules for encryption, access control, and storage location, determined by the sensitivity level of the group. These contracts are dynamically generated by the smart contract engine and stored immutably in a blockchain ledger. The blockchain acts as a governance layer, ensuring transparency, traceability, and security.

The third function, 'encrypt_data', applies encryption protocols to each data subset based on the rules defined in its associated smart contract. The system dynamically generates encryption keys using inputs like user biometrics, device-specific information, and cryptographic algorithms. For sensitive data groups, the system uses asymmetric cryptography, while less sensitive groups may utilize symmetric encryption for computational efficiency. The encrypted data is stored with metadata linking the encryption keys and protocols to the corresponding smart contracts.

The fourth function, 'encode_to_DNA', converts the encrypted digital data into synthetic DNA sequences. The DNA encoding engine translates binary content into nucleotide sequences represented by combinations of A, T, G, and C. These sequences are synthesized and stored as physical strands of synthetic DNA in designated labs. Storage locations are determined based on rules within the smart contracts, ensuring that highly sensitive data is stored in labs with enhanced security protocols.

The fifth function, 'store_in_DNA_lab', handles the physical storage process. The system assigns a DNA lab for each nucleotide sequence based on the smart contract's rules. Once stored, the blockchain ledger is updated with information about the storage lab, enabling future retrieval processes to identify the correct storage location.

The sixth function, 'retrieve_data', manages the retrieval of DNA-encoded data. A user request to retrieve information must include biometric authentication and device-specific details to validate the identity of the requester. The system triggers the relevant smart contracts to enforce access control, ensuring that only authorized entities can retrieve the data. The blockchain ledger is queried to identify the correct storage labs, and the nucleotide sequences are retrieved and aggregated.

The seventh function, 'decode_from_DNA', converts the retrieved nucleotide sequences back into their original binary form. The DNA decoding engine applies error correction algorithms to ensure accuracy and reconstructs the binary data from the nucleotide sequences. The system then decrypts the reconstructed data using the encryption keys linked to the smart contracts, delivering the original digital information to the user.

The final function, 'detect_and_correct_anomalies', ensures the reliability and accuracy of the retrieved data. The anomaly detection engine validates the integrity of the decoded data by checking for inconsistencies or errors. If anomalies are detected, the engine triggers corrective actions, such as re-initiating the retrieval process or applying additional error correction protocols. This step guarantees that the final output is complete, accurate, and free of corruption.

This pseudocode implements an end-to-end system for securely managing data storage and retrieval in synthetic DNA computing infrastructures. By integrating generative AI, blockchain-based smart contracts, encryption engines, and anomaly detection modules, the invention ensures data security, accuracy, and accessibility. The use of smart contracts enables automated enforcement of access control rules, while the blockchain ledger ensures transparency and immutability of all operations. The modular design of the system allows for seamless scalability and adaptability to evolving data security and storage requirements. This comprehensive solution unlocks the potential of synthetic DNA as a scalable, secure, and durable medium for digital data storage.

A skilled artisan, upon reviewing the disclosure, will appreciate that there are numerous alternatives, modifications, combinations, and customizations that can be made to the systems and methods described herein. In particular, the systems and methods described herein for orchestrating synthetic DNA computing as a service (DNAaaS) for secure data storage and retrieval offer significant flexibility and extensibility. Various alternatives, modifications, combinations, and customizations can be made to these systems and methods while remaining within the spirit and scope of the invention.

One possible alternative involves the substitution of the blockchain-based distributed ledger with other decentralized or centralized validation frameworks. While the described system leverages blockchain for immutability, transparency, and tamper-proof governance, other technologies such as distributed hash tables (DHT), directed acyclic graph (DAG)-based ledgers, or secure centralized repositories could be used to manage and index smart contracts, storage locations, and cryptographic fingerprints. These alternatives may offer different performance benefits, such as faster validation times, reduced energy consumption, or simplified deployment for smaller-scale applications.

Modifications to the generative AI engine are also possible. While the current invention relies on generative AI to analyze and classify digital information, other AI or machine learning models, such as convolutional neural networks (CNNs) for image analysis, recurrent neural networks (RNNs) for sequential data, or transformer-based architectures, could be integrated to enhance performance for specific data types. Additionally, the sensitivity classification process could incorporate external rule-based systems, heuristics, or predefined sensitivity templates to supplement or replace AI-based classification, particularly in environments with well-defined data policies or regulatory requirements.

The encryption engine may also be modified to use alternative cryptographic techniques, including homomorphic encryption, quantum-resistant encryption algorithms, or multi-party computation (MPC). Homomorphic encryption would allow computations to be performed on encrypted data directly without decryption, enabling secure processing of sensitive DNA-encoded information. Quantum-resistant encryption algorithms, such as lattice-based or hash-based cryptographic schemes, could be integrated to ensure future-proof security against quantum computing threats. Multi-party computation could facilitate collaborative encryption and decryption processes across multiple entities without exposing the underlying sensitive data to any single party.

The DNA encoding and decoding processes can be customized to use alternative DNA sequencing and synthesis techniques. For example, different encoding schemes beyond binary-to-nucleotide mapping, such as trinary or quaternary encoding mechanisms, could optimize the efficiency of the DNA encoding process. Error correction protocols could also be customized to include alternative techniques like Turbo codes, LDPC (Low-Density Parity-Check) codes, or machine learning-driven error correction methods. For enhanced durability, alternative synthesis methods, such as enzymatic DNA synthesis or improved chemical synthesis techniques, could be adopted to optimize the cost, speed, and accuracy of generating DNA strands.

Combinations with other secure storage technologies are also within the scope of the invention. The system may be integrated with traditional or emerging storage methods, such as magnetic tape storage, solid-state drives (SSDs), or optical storage systems, to create hybrid architectures. For example, highly sensitive subsets of data could be stored in synthetic DNA, while less sensitive subsets are stored in conventional storage infrastructures. This combination provides a cost-effective solution for organizations looking to leverage the durability and density of DNA storage for critical data while maintaining efficient access to frequently used data in traditional systems.

Alternative validation and access control methods could replace or supplement the existing biometric and device-specific validation mechanisms. For instance, the system could integrate multi-factor authentication (MFA) approaches using behavioral biometrics, such as keystroke dynamics, voice patterns, or gait recognition, in combination with token-based or passwordless authentication systems. Further, federated identity management systems could be implemented to enable cross-organizational authentication and secure sharing of DNA-stored data among trusted entities, such as banks or research institutions.

The system architecture can be customized to operate in various deployment environments, such as cloud-based, edge-based, or on-premise configurations. A cloud-based implementation would allow global access to DNA storage services with centralized AI processing and smart contract management. In contrast, edge-based deployments could be designed for latency-sensitive applications, where AI classification, encryption, and access validation occur on local devices or servers. An on-premise deployment would be suitable for organizations requiring strict control over their DNA storage infrastructure, such as government agencies or defense organizations handling classified data.

Customization can also be applied to the redundancy and fault-tolerance mechanisms used within the DNA computing infrastructure. While the described system distributes redundant DNA sequences across geographically dispersed labs, alternative redundancy schemes, such as erasure coding, sharding, or adaptive replication, may be implemented to optimize storage efficiency and fault recovery. For example, sharding techniques could fragment DNA-encoded sequences into smaller pieces and distribute them across multiple labs, while erasure coding would allow for partial data recovery in the event of failures.

The described invention can also be extended to include real-time monitoring and predictive analytics for managing DNA storage systems. By integrating Internet of Things (IoT) sensors, environmental data such as temp, humidity, and physical integrity of DNA storage labs can be monitored continuously to predict potential risks or degradation. Machine learning models could analyze this data to dynamically adjust redundancy protocols, relocate sensitive DNA sequences, or initiate preventive maintenance processes.

Additionally, the invention can support alternative use cases and data types beyond the described examples of check images, text, and videos. It may be extended to store encrypted genetic data, records, financial transaction logs, scientific research datasets, or multimedia archives. For collaborative environments, such as research consortia or multinational corporations, the system could provide specialized workflows for securely aggregating, analyzing, and sharing DNA-stored data across multiple entities while ensuring regulatory compliance with frameworks such as GDPR, HIPAA, or CCPA.

The smart contract generation engine can also be modified to support versioning and automated updates of smart contracts. For instance, smart contracts could include self-updating mechanisms based on changes in data sensitivity, encryption standards, or regulatory requirements. Additionally, modular smart contracts could be designed to interact with external systems, enabling advanced data workflows such as automatic data expiration, regulatory audits, or dynamic permission updates for multi-entity collaborations.

The anomaly detection engine may incorporate enhanced machine learning algorithms to predict and mitigate risks associated with data anomalies or errors. By training on historical retrieval and validation patterns, the engine could proactively identify patterns indicative of storage degradation, access failures, or malicious activities. Advanced anomaly detection techniques, such as adversarial machine learning or reinforcement learning, could be applied to continuously improve the system's ability to detect and resolve anomalies in DNA-stored data.

The system can also support the integration of hardware acceleration technologies to optimize performance. Hardware accelerators, such as field-programmable gate arrays (FPGAs), application-specific integrated circuits (ASICs), or GPU-optimized computing clusters, could accelerate processes like AI-based data classification, encryption, and DNA encoding. For example, parallelized encoding algorithms executed on GPUs could significantly reduce the time required to encode large datasets into DNA sequences.

In addition, modifications to the user interface could enhance usability and accessibility for different types of users. The generative AI prompt engine could include advanced natural language processing (NLP) capabilities to enable more intuitive user interactions. For instance, users could provide prompts in their natural language to store, retrieve, or manage DNA-stored data, while the system autonomously interprets and executes the necessary operations. Similarly, graphical user interfaces (GUIs) or application programming interfaces (APIs) could be customized to meet the requirements of enterprise clients, developers, or research institutions.

These alternatives, modifications, combinations, and customizations demonstrate the adaptability and extensibility of the systems and methods described herein. By leveraging emerging technologies, integrating new frameworks, and supporting a range of deployment scenarios and use cases, the invention provides a scalable, secure, and future-proof solution for managing data storage and retrieval in synthetic DNA infrastructures. All such variations are intended to fall within the spirit and scope of this disclosure.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for securely orchestrating data storage and retrieval in synthetic DNA computing systems, the method comprising:

receiving, by a generative AI prompt engine, digital information and a user request to store or retrieve said digital information, wherein said user request includes biometric authentication data and device-specific information;

analyzing, by an information classification engine, the digital information to identify and classify multiple subsets of the digital information based on sensitivity and confidentiality levels;

generating, by a smart contract generation engine, one or more dynamic smart contracts corresponding to the classified subsets of the digital information, wherein each smart contract defines encryption protocols, encoding rules, access entitlements, and storage locations for its respective subset of the digital information;

encrypting, by an encryption engine, each subset of the digital information based on the encryption protocols defined in the corresponding smart contract;

encoding, by a DNA encoding engine, the encrypted subsets of the digital information into synthetic DNA sequences represented by nucleotide bases;

distributing, by an information processing engine, DNA-encoded subsets of the digital information to multiple synthetic DNA computing infrastructures for storage, wherein the storage locations are determined based on sensitivity and confidentiality rules defined in the corresponding smart contracts;

storing, by the synthetic DNA computing infrastructures, the DNA-encoded subsets of the digital information in a secure and retrievable format;

receiving, by the generative AI prompt engine, a user request to retrieve specific portions of the digital information, wherein the request includes biometric authentication data and device-specific information;

validating, by the smart contract generation engine, the user request by verifying the biometric authentication data, device-specific information, and user access entitlements against the corresponding smart contracts;

retrieving, by the information processing engine, the DNA-encoded subsets of the digital information from one or more synthetic DNA computing infrastructures based on the validated request and corresponding smart contracts;

decoding, by a DNA decoding engine, the retrieved DNA-encoded subsets of the digital information into their original encrypted form based on decoding protocols defined in the corresponding smart contracts;

decrypting, by the encryption engine, decoded subsets of the digital information to reconstruct the original digital information;

validating, by an anomaly detection engine, integrity and accuracy of reconstructed digital information; and transmitting, by the information processing engine, the validated and reconstructed digital information to the requesting user or entity, wherein transmission is secured based on the access entitlements and rules defined in the corresponding smart contracts.

2. The method of claim 1, wherein the biometric authentication data includes at least one of fingerprint data, iris scan data, facial recognition data, or voice recognition data to validate the identity of the user initiating the storage or retrieval request.

3. The method of claim 2, wherein the device-specific information includes at least one of a device IP address, device identifier, geolocation data, or cryptographic device token to ensure the request originates from an authorized device.

4. The method of claim 3, wherein the information classification engine dynamically updates a sensitivity classification of the digital information using machine learning models trained on historical classification patterns and user feedback.

5. The method of claim 4, wherein the smart contract generation engine generates a repository of reusable smart contracts for recurring types of digital information to optimize processing time for subsequent storage or retrieval requests.

6. The method of claim 5, wherein the encryption engine dynamically selects encryption algorithms based on the sensitivity classification, wherein highly sensitive subsets are encrypted using asymmetric cryptographic protocols and less sensitive subsets are encrypted using symmetric cryptographic protocols.

7. The method of claim 6, wherein the information processing engine distributes the DNA-encoded subsets of the digital information across synthetic DNA computing infrastructures located in geographically diverse storage facilities to ensure redundancy and data availability.

8. The method of claim 7, wherein the anomaly detection engine detects inconsistencies in the reconstructed digital information during the retrieval process and triggers corrective actions, including initiating re-aggregation of DNA-encoded subsets from the synthetic DNA computing infrastructures.

9. The method of claim 8, wherein the blockchain-based distributed ledger records at least one of the storage request, retrieval request, validation steps, smart contract execution, and DNA storage locations to ensure transparency, immutability, and auditability of all data operations.

10. A method for securely orchestrating data storage and retrieval in synthetic DNA computing systems, the method comprising:

receiving, by a generative AI prompt engine, digital information and a user request to store or retrieve said digital information, wherein said user request includes biometric authentication data comprising at least one of fingerprint data, iris scan data, facial recognition data, or voice recognition data, and device-specific information comprising at least one of a device IP address, device identifier, geolocation data, cryptographic device tokens, or hardware characteristics to verify the authenticity of the device and user initiating the request;

analyzing, by an information classification engine, the digital information to identify, classify, and segment multiple subsets of the digital information based on predefined sensitivity and confidentiality levels, wherein the sensitivity classification dynamically updates using machine learning models trained on historical classification patterns, contextual data, user behavior, and feedback to ensure accuracy and adaptability to evolving data sensitivity thresholds;

generating, by a smart contract generation engine, one or more dynamic smart contracts corresponding to each of the classified subsets of the digital information, wherein the smart contracts define at least one of encryption protocols, DNA encoding rules, storage locations, user-specific access entitlements, retrieval permissions, validation requirements, device-specific rules, and geolocation restrictions, and wherein the smart contracts are stored in a repository and indexed for future reuse with recurring types of classified information, thereby optimizing processing time for subsequent storage or retrieval requests;

encrypting, by an encryption engine, each classified subset of the digital information based on the encryption protocols defined in the corresponding smart contracts, wherein highly sensitive subsets are encrypted using asymmetric cryptographic protocols that provide key pair mechanisms, and less sensitive subsets are encrypted using symmetric cryptographic protocols to achieve a balance between security and computational efficiency;

encoding, by a DNA encoding engine, the encrypted subsets of the digital information into synthetic DNA sequences, wherein the encoding process converts binary digital data into nucleotide sequences represented by combinations of A, T, G, and C, and wherein encoding parameters, such as error correction algorithms, sequence redundancy levels, and storage durability requirements, are determined based on rules defined in the corresponding smart contracts;

distributing, by an information processing engine, DNA-encoded subsets of the digital information to multiple synthetic DNA computing infrastructures located in geographically diverse and secure storage facilities, wherein the distribution is governed by the data sensitivity classification, security protocols, and redundancy requirements defined in the smart contracts, such that highly sensitive subsets are assigned to high-security DNA labs with advanced physical and digital safeguards, and less sensitive subsets are distributed to general-purpose DNA storage infrastructures;

storing, by the synthetic DNA computing infrastructures, the DNA-encoded subsets of the digital information in a secure, durable, and retrievable format, wherein each storage location and associated security level is logged and indexed within the system for future retrieval purposes;

recording, by a blockchain-based distributed ledger, all transactions associated with the storage and retrieval processes, including at least one of the storage request, retrieval request, biometric validation steps, device verification steps, smart contract execution, encryption and decryption protocols, DNA storage locations, and error correction processes, to ensure transparency, immutability, auditability, and verifiability of all operations performed on DNA-stored data;

receiving, by the generative AI prompt engine, a user or entity request to retrieve specific portions of the digital information, wherein the retrieval request includes biometric authentication data, device-specific information, contextual request parameters, and user-defined access entitlements;

validating, by the smart contract generation engine, the user retrieval request by verifying at least one of the biometric authentication data, device-specific information, and user access entitlements against the corresponding smart contracts stored on the blockchain ledger, wherein the validation process includes checking request compliance with retrieval permissions, geolocation restrictions, and encryption protocols;

retrieving, by the information processing engine, the DNA-encoded subsets of the digital information from one or more synthetic DNA computing infrastructures, wherein the retrieval process includes orchestrating the secure aggregation of subsets of DNA-encoded data from geographically dispersed storage locations based on storage parameters and access entitlements defined in the corresponding smart contracts;

decoding, by a DNA decoding engine, the retrieved DNA-encoded subsets of the digital information into their original encrypted form, wherein the decoding process applies error correction algorithms, data integrity checks, and sequence validation to ensure accuracy, completeness, and consistency of decoded digital information;

decrypting, by the encryption engine, decoded subsets of the digital information using the corresponding encryption protocols, wherein decryption keys are generated dynamically based on user biometric authentication, device-specific tokens, and contextual request parameters to ensure that only authorized users or entities can reconstruct the original digital information;

validating, by an anomaly detection engine, the integrity, accuracy, and completeness of decrypted digital information, wherein the anomaly detection engine compares reconstructed data against predefined accuracy thresholds, historical integrity benchmarks, and user feedback, and wherein any detected inconsistencies or errors trigger corrective actions, including re-initiating data retrieval, re-aggregating DNA-encoded subsets, and reapplying decoding or error correction algorithms;

transmitting, by the information processing engine, the validated and reconstructed digital information to the requesting user or entity, wherein the transmission process is secured based on user-specific access entitlements, encryption protocols, and validation rules defined in the corresponding smart contracts, and wherein partial or full subsets of the digital information are delivered based on authorization levels of the requesting user or entity; and updating, by the blockchain-based distributed ledger, a verifiable record of the retrieval transaction, including validation steps, user identity verification, storage locations accessed, decoding processes performed, error correction activities, and access entitlement enforcement, to ensure end-to-end traceability, transparency, and compliance with data management policies.

11. A system for securely orchestrating data storage and retrieval in synthetic DNA computing systems, the system comprising: one or more processors and a non-transitory memory storing instructions that, when executed by the one or more processors, cause the system to implement:

a generative AI prompt engine that receives digital information and a user request to store or retrieve said digital information, wherein the user request includes biometric authentication data comprising at least one of fingerprint data, iris scan data, facial recognition data, or voice recognition data, and device-specific information comprising at least one of a device IP address, device identifier, geolocation data, cryptographic tokens, or hardware characteristics, and wherein the generative AI prompt engine processes the received digital information and request for further analysis;

an information classification engine communicatively coupled to the generative AI prompt engine that analyzes the digital information to identify, segment, and classify subsets of the digital information based on sensitivity and confidentiality levels, wherein the information classification engine dynamically updates sensitivity classifications using machine learning models trained on historical classification patterns, contextual analysis, and user feedback;

a smart contract generation engine communicatively coupled to the information classification engine that generates one or more dynamic smart contracts corresponding to the classified subsets of the digital information, wherein each smart contract defines encryption protocols, encoding rules, access entitlements, retrieval permissions, validation requirements, device-specific rules, geolocation restrictions, and storage locations, and wherein the generated smart contracts are stored in a repository and indexed for reuse with recurring digital information types;

an encryption engine communicatively coupled to the smart contract generation engine that encrypts each classified subset of the digital information based on encryption protocols defined in the corresponding smart contracts, wherein highly sensitive subsets are encrypted using asymmetric cryptographic protocols and less sensitive subsets are encrypted using symmetric cryptographic protocols, and wherein the encryption engine generates dynamic encryption keys using user biometric authentication data and device-specific parameters;

a DNA encoding engine communicatively coupled to the encryption engine that encodes the encrypted subsets of the digital information into synthetic DNA sequences represented by nucleotide bases, wherein the DNA encoding engine applies error correction algorithms, sequence redundancy, and encoding protocols defined in the smart contracts to ensure accuracy and durability of DNA-encoded data;

an information processing engine communicatively coupled to the DNA encoding engine that distributes DNA-encoded subsets of the digital information to multiple synthetic DNA computing infrastructures located in geographically diverse storage facilities, wherein the distribution is governed by the sensitivity classification, redundancy requirements, and storage security rules defined in the corresponding smart contracts;

a plurality of synthetic DNA computing infrastructures communicatively coupled to the information processing engine that stores the DNA-encoded subsets of the digital information in a secure, durable, and retrievable format, wherein each storage location and associated security level is indexed and logged for retrieval purposes;

a blockchain-based distributed ledger communicatively coupled to the smart contract generation engine and the synthetic DNA computing infrastructures that records all operations associated with storage and retrieval, including storage requests, retrieval requests, validation steps, smart contract executions, encryption parameters, DNA storage locations, and error correction processes, to ensure transparency, immutability, and auditability of all transactions;

a DNA decoding engine communicatively coupled to the synthetic DNA computing infrastructures and the information processing engine that decodes DNA-encoded subsets of the digital information retrieved from the synthetic DNA computing infrastructures into their original encrypted form, wherein decoding protocols, error correction algorithms, and sequence validations are applied to ensure accuracy and completeness of the decoded data;

a decryption engine communicatively coupled to the DNA decoding engine that decrypts the decoded subsets of the digital information using encryption keys dynamically generated based on user biometric authentication data, device-specific tokens, and access entitlements defined in the corresponding smart contracts, wherein the decrypted subsets are reassembled to reconstruct the original digital information;

an anomaly detection engine communicatively coupled to the decryption engine that validates integrity, accuracy, and completeness of the reconstructed digital information, wherein the anomaly detection engine detects inconsistencies or errors and triggers corrective actions, including re-initiating retrieval, re-aggregating DNA-encoded subsets, or reapplying decoding and error correction algorithms; and the information processing engine further transmitting the validated and reconstructed digital information to the requesting user or entity, wherein the transmission process is secured based on user access entitlements, encryption rules, and retrieval permissions defined in the corresponding smart contracts, and wherein the system ensures that only authorized users or entities can access specific subsets of the digital information.

12. The system of claim 11, wherein the generative AI prompt engine is further configured to analyze the user request and dynamically generate contextual parameters, including time of request, user role, device type, frequency of access, and historical request patterns, to enhance validation and optimize the classification, encryption, and retrieval processes during storage or retrieval operations.

13. The system of claim 12, wherein the information classification engine is further configured to perform multi-layer contextual analysis by identifying patterns within the digital information, applying weighted sensitivity scores to individual subsets, correlating the information's sensitivity to predefined thresholds, analyzing metadata such as timestamps, geolocation, and content origin, and refining sensitivity classifications through iterative machine learning models trained on user feedback and historical data patterns.

14. The system of claim 13, wherein the smart contract generation engine is further configured to define storage-specific security protocols, including encryption refresh cycles based on sensitivity levels, multi-factor validation triggers for highly sensitive data, geofencing rules that restrict storage and retrieval operations to specific geographic regions, and access expiration times for temporary or time-bound retrieval requests, ensuring dynamic and adaptive control of stored data subsets.

15. The system of claim 14, wherein the encryption engine is further configured to generate dynamic and ephemeral encryption keys for each classified subset of the digital information, wherein the encryption keys are derived using a combination of biometric data, device-specific tokens, geolocation data, cryptographic random number generation, and time-based algorithms to ensure that the encryption keys are unique, unpredictable, and resistant to cryptographic attacks.

16. The system of claim 15, wherein the DNA encoding engine is further configured to apply redundancy and fault-tolerance protocols by creating multiple encoded DNA sequences for each highly sensitive subset of digital information, wherein redundancy is achieved through duplication, fragmentation, and error correction algorithms, ensuring resilience against data loss, physical degradation of DNA sequences, or storage anomalies in synthetic DNA computing infrastructures.

17. The system of claim 16, wherein the information processing engine is further configured to continuously monitor availability, performance, and security status of the synthetic DNA computing infrastructures in real time, wherein the monitoring process includes detecting storage anomalies, environmental risks, unauthorized access attempts, or infrastructure downtime, and dynamically adjusting a distribution strategy to reroute highly sensitive subsets to alternate secure DNA computing infrastructures when potential threats or failures are identified.

18. The system of claim 17, wherein the blockchain-based distributed ledger is further configured to store hash-based cryptographic fingerprints of encrypted DNA-encoded data subsets, wherein the cryptographic fingerprints are generated using hashing algorithms such as SHA-256 or SHA-3, and wherein said fingerprints are used to verify the authenticity, immutability, and integrity of stored and retrieved data across distributed DNA computing infrastructures.

19. The system of claim 18, wherein the DNA decoding engine is further configured to perform sequence validation and integrity verification using multi-stage error detection and correction algorithms, including checksum calculations, parity bit validation, and advanced Reed-Solomon error correction methods, wherein the system ensures accurate decoding and reconstruction of digital information even in scenarios where the DNA-encoded data is fragmented or stored across geographically distributed infrastructures.

20. The system of claim 19, wherein the anomaly detection engine is further configured to continuously log detected anomalies in a centralized audit repository, generate real-time alerts for system administrators or automated monitoring systems, and trigger machine learning-based corrective measures that include reclassifying misidentified data, re-initiating retrieval processes, recalibrating sensitivity classifications, and refining encoding, encryption, and decoding parameters to enhance future performance and reduce a likelihood of recurring anomalies.

* * * * *